US012773963B2

(12) United States Patent
Sugiyama et al.

(10) Patent No.: US 12,773,963 B2
(45) Date of Patent: Oct. 27, 2026

(54) SHOCK-ABSORBING MEMBER AND VEHICLE

(71) Applicant: SUMITOMO CHEMICAL COMPANY, LIMITED, Tokyo (JP)

(72) Inventors: Takayuki Sugiyama, Tsukuba (JP); Tasuku Tamura, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 406 days.

(21) Appl. No.: 18/561,710

(22) PCT Filed: May 13, 2022

(86) PCT No.: PCT/JP2022/020212
§ 371 (c)(1),
(2) Date: Nov. 16, 2023

(87) PCT Pub. No.: WO2022/244698
PCT Pub. Date: Nov. 24, 2022

(65) Prior Publication Data

US 2024/0227712 A1 Jul. 11, 2024

(30) Foreign Application Priority Data

May 19, 2021 (JP) ................................. 2021-084347
Dec. 28, 2021 (JP) ................................. 2021-214975

(51) Int. Cl.
*B60R 19/34* (2006.01)
*F16F 7/12* (2006.01)
*B60R 19/26* (2006.01)

(52) U.S. Cl.
CPC .............. *B60R 19/34* (2013.01); *F16F 7/121* (2013.01); *F16F 7/124* (2013.01); *B60R 2019/264* (2013.01)

(58) Field of Classification Search
CPC .... B60R 19/34; B60R 2019/264; F16F 7/121; F16F 7/124
(Continued)

(56) References Cited

U.S. PATENT DOCUMENTS 6,472,043 B1 10/2002 Kobayashi et al.
8,905,206 B2 * 12/2014 Zannier .................. F16F 7/121
293/133

(Continued)

FOREIGN PATENT DOCUMENTS

CN 105398099 B 5/2017
CN 110406178 A 11/2019

(Continued)

OTHER PUBLICATIONS

International Search Report issued in International Patent Application No. PCT/JP2022/020212, dated Jul. 19, 2022 w/English MT.

*Primary Examiner* — Christopher P Schwartz
(74) *Attorney, Agent, or Firm* — Rimon P.C.

(57) ABSTRACT

This shock-absorbing member comprises a molded part containing a thermoplastic resin. The molded part is provided with a main body having a honeycomb structure filled with a plurality of tubular cells. All or some of the tubular cells constituting the honeycomb structure are arrayed with cell walls interposed therebetween, the cell walls having a thickness gradient that satisfies the relationship of expression (G) and that is found by the following "method of calculating the cell wall thickness gradient".
[Method of calculating the cell wall thickness gradient]
Procedure 1): set a central axis (a), which passes through one end-surface center of gravity and another end-surface center of gravity in a first tubular cell that has a height (H).
(Continued)

Procedure 2): set any two faces (b) and (c) perpendicular to the central axis (a) within the range of the height (H) of the first tubular cell, and let the distance between the two faces (b) and (c) be h (units: mm; $0<h<H$).

Procedure 3): let the thickness of the cell wall between the first tubular cell and a second tubular cell adjacent thereto be (t1) (units: mm) at a location where the cell wall and the surface (b) cross.

Procedure 4): let the thickness of the cell wall between the first tubular cell and the second tubular cell adjacent thereto be (t2) (units: mm) at a location where the cell wall and the surface (c) cross.

Procedure 5): calculate ($|t2-t1|/h$) as the cell wall thickness gradient

[Math. 1]

$$62.5\times10^{-4} < \frac{|t2-t1|}{h} < 250\times10^{-4} \quad (G)$$

6 Claims, 6 Drawing Sheets

(58) Field of Classification Search
USPC .......................... 188/371–377; 293/133, 146
See application file for complete search history.

(56) References Cited

U.S. PATENT DOCUMENTS

| | | | | |
|---|---|---|---|---|
| 11,077,812 | B2 * | 8/2021 | Rodgers | F16F 7/12 |
| 2009/0174219 | A1 * | 7/2009 | Foreman | B60R 21/04 296/187.03 |
| 2011/0316307 | A1 | 12/2011 | Di Modugno | |
| 2014/0339036 | A1 * | 11/2014 | Arai | B29D 99/0014 188/371 |
| 2016/0264083 | A1 | 9/2016 | Ishitsuka | |
| 2017/0016503 | A1 | 1/2017 | Teshima | |
| 2017/0072884 | A1 | 3/2017 | Zannier | |
| 2020/0180535 | A1 | 6/2020 | Kito et al. | |

FOREIGN PATENT DOCUMENTS

| | | | | |
|---|---|---|---|---|
| CN | 112966353 | A * | 6/2021 | G06F 30/20 |
| CN | 115497583 | A * | 12/2022 | G06F 30/23 |
| CN | 116928259 | A * | 10/2023 | F16F 7/121 |
| EP | 0922876 | A1 | 6/1999 | |
| EP | 2787241 | A1 | 10/2014 | |
| JP | 02-054754 | U | 4/1990 | |
| JP | 09-048301 | A | 2/1997 | |
| JP | 11-013806 | A | 1/1999 | |
| JP | 2000-274472 | A | 10/2000 | |
| JP | 2008-230235 | A | 10/2008 | |
| JP | 2015-519233 | A | 7/2015 | |
| JP | 2016-169858 | A | 9/2016 | |
| JP | 2017-106611 | A | 6/2017 | |
| JP | 2017-179237 | A | 10/2017 | |
| JP | 2021-139496 | A | 9/2021 | |
| JP | 2022-064207 | A | 4/2022 | |
| WO | 2012/014091 | A1 | 2/2012 | |
| WO | 2013/080974 | A1 | 6/2013 | |
| WO | 2013/180978 | A1 | 12/2013 | |
| WO | 2015/125646 | A1 | 8/2015 | |

* cited by examiner

SHOCK-ABSORBING MEMBER AND VEHICLE

CROSS-REFERENCE TO RELATED APPLICATIONS

This application is the U.S. National Phase under 35 U.S.C. § 371 of International Application No. PCT/JP2022/020212, filed on May 13, 2022, which in turn claims priority to Japanese Patent Application Nos. 2021-084347 & 2021-214975, filed on May 19, 2021 & Dec. 28, 2021 respectfully, the entire contents of each of which Applications are hereby incorporated by reference.

TECHNICAL FIELD

The present invention relates to a shock-absorbing member and a vehicle.

The present invention claims priority on the basis of Japanese Patent Application No. 2021-084347, filed in Japan on May 19, 2021, and Japanese Patent Application No. 2021-214975, filed in Japan on Dec. 28, 2021, the contents of which are incorporated herein by reference.

BACKGROUND ART

Structural members in vehicles such as automobiles are required to be lightweight to save fuel consumption and to improve collision safety.

For example, a crash box is installed as a structural member for shock-absorbing (hereinafter, referred to as "shock-absorbing member") in the front or rear of a vehicle to protect occupants by suppressing deformation of the vehicle interior by absorbing impact when the vehicle collides. This crash box is installed between a front side member (frame) that extends in the front-back direction of the vehicle and a bumper beam, and absorbs an impact energy by crushing in the front-back direction thereof when the compression force caused by the collision is applied to the vehicle in the front-back direction thereof.

A shock-absorbing member is conventionally manufactured from a metal material. However, there has been a desire to reduce the weight of vehicles so as to save fuel consumption, in recent years, as described above, and development of technologies that realize light weight and excellent impact energy absorption performance in the shock-absorbing member has been currently underway.

In contrast, development of a shock-absorbing member using a resin material as a forming material is under consideration.

A sandwich structure in which two surface layers and an inner layer are integrated is used as a structural member having high strength for an aircraft structural member, an automobile member, a building member, or the like. A honeycomb structure is used in the inner layer of the sandwich structure.

For example, Patent Document 1 proposes a honeycomb structure in which strength is improved and a resin composition containing a thermoplastic resin and reinforced fibers is used as a forming material.

CITATION LIST

Patent Literature

Patent Document 1: Japanese Translation of PCT International Application, Publication No. 2015-519233

SUMMARY OF INVENTION

Problem to be Solved by Invention

A crash box as a shock-absorbing member, for example, makes it possible to absorb energy efficiently by causing compression destruction sequentially due to impact load applied in the front-back direction of a vehicle.

A large impact energy is applied to this shock-absorbing member in a short time at the time of collision. However, a conventional shock-absorbing member made from a resin exhibits a low impact energy absorption capacity at the time of collision, and further improvement in impact energy absorption capacity is required.

The present invention has been made in view of such circumstances, and aims to provide a shock-absorbing member, the weight of which is reduced, and the impact energy absorption capacity of which is enhanced, using a resin material as a forming material, as well as a vehicle in which the shock-absorbing member is installed.

Means to Solve the Problem

The present invention encompasses the following aspects.

[1] A shock-absorbing member including a molded part containing a thermoplastic resin, wherein the molded part includes a main part having a honeycomb structure filled with plural tubular cells, a part or all of the tubular cells constituting the honeycomb structure is arrayed via cell walls of which the thickness gradient ($|t2-t1|/h$) determined by the below-mentioned [method of calculating a cell wall thickness gradient] satisfies the relationship of expression (G).

[Math. 1]

$$62.5\times10^{-4} < \frac{|t2-t1|}{h} < 250\times10^{-4} \tag{G}$$

[Method of Calculating the Cell Wall Thickness Gradient]

Procedure 1): A central axis a which passed through a center of gravity at one end face of a first tubular cell having a height H and a center of gravity at the other end face thereof is determined.

Procedure 2): Arbitrary two faces b and c perpendicular to the central axis a are set within a range of the height H of the first tubular cell, and h (unit: mm; $0<h<H$) is determined as a distance between the two faces b and c.

Procedure 3): t1 (unit mm) is determined as a thickness of a cell wall at a position where the cell wall between the first tubular cell and a second tubular cell adjacent to the first tubular cell crosses the face b.

Procedure 4): t2 (unit mm) is determined as a thickness of the cell wall at a position where the cell wall between the first tubular cell and the second tubular cell adjacent to the first tubular cell crosses the face c.

Procedure 5): The cell wall thickness gradient is calculated by ($|t2-t1|/h$).

[2] The shock-absorbing member according to[1], wherein the molded part is an injection molded part.

[3] The shock-absorbing member according to [1] or [2], wherein the molded part further contains a fibrous filler.

[4] The shock-absorbing member according to [3], wherein the length-weighted average fiber length of the fibrous filler in the molded part is 0.5 mm or more.

[5] The shock-absorbing member according to any one of [1] to [4], wherein the thermoplastic resin is a liquid crystal polyester resin.

[6] A vehicle including the shock-absorbing member of any one of [1] to [5] installed in at least one selected from a front part, a rear part and a side part of the vehicle.

Effects of Invention

The present invention makes it possible to provide a shock-absorbing member, the weight of which is reduced by using a resin material as a forming material, and the impact energy absorption capacity of which is further enhanced.

The present invention particularly makes it possible to improve the impact energy absorption amount and the impact energy absorption efficiency per unit weight.

In addition, it is possible to provide a vehicle that makes it possible to save fuel consumption and to improve collision safety by applying the impact absorbing member.

EMBODIMENTS FOR CARRYING OUT INVENTION

A shock-absorbing member installed in a vehicle causes its own structural member to crush at the time of collision, thereby absorbing impact applied by collision. Therefore, a material having relatively low strength and rigidity is selected as a material of the shock-absorbing member. A crash box made from aluminum is conventionally applied as a shock-absorbing member installed in a vehicle, for example.

The present inventors confirmed, during proceeding development of a shock-absorbing member made from resin, that the maximum load applied to a crash box made from aluminum at the time of collision was large. An increase of the maximum load increases impact on the occupant protection space, makes it impossible to realize expected collision safety performance due to a damage on another member, or makes it difficult to repair a vehicle body. Therefore, an aimed shock-absorbing member is desired to make it possible to suppress the maximum load applied at the time of collision, and to realize high impact energy absorption efficiency (=an actual impact energy absorption amount/an impact energy absorption amount obtained by a product of maximum load and displacement amount of member).

In addition, a shock-absorbing member made from resin tends to exhibit low impact energy absorption amount at the time of collision along with a decrease in the weight thereof. Therefore, an aimed shock-absorbing member is desired to have a high impact energy absorption amount per unit weight.

In view of the purpose, the present inventors found that both impact energy absorption amount per unit weight and impact energy absorption efficiency are improved by adopting a "honeycomb structure made from resin" in a main part of a shock-absorbing member and controlling the thickness of a cell wall between cells constituting it to a particular thickness, thereby completing the present invention.

(Shock-Absorbing Member)

A shock-absorbing member according to one aspect of the present invention is characterized by a main part made from resin, and various conventionally-known shock-absorbing members may be applied to members other than the main part.

The shock-absorbing member of the present embodiment is a structural member including a molded part containing a thermoplastic resin. The molded part in the shock-absorbing member of the present embodiment includes a main part having a honeycomb structure filled with plural tubular cells. The honeycomb structure is not limited to a regular hexagonal columns, but may encompasses a three-dimensional space-filling solid in which solid figures are arranged without gaps.

Figure 1:
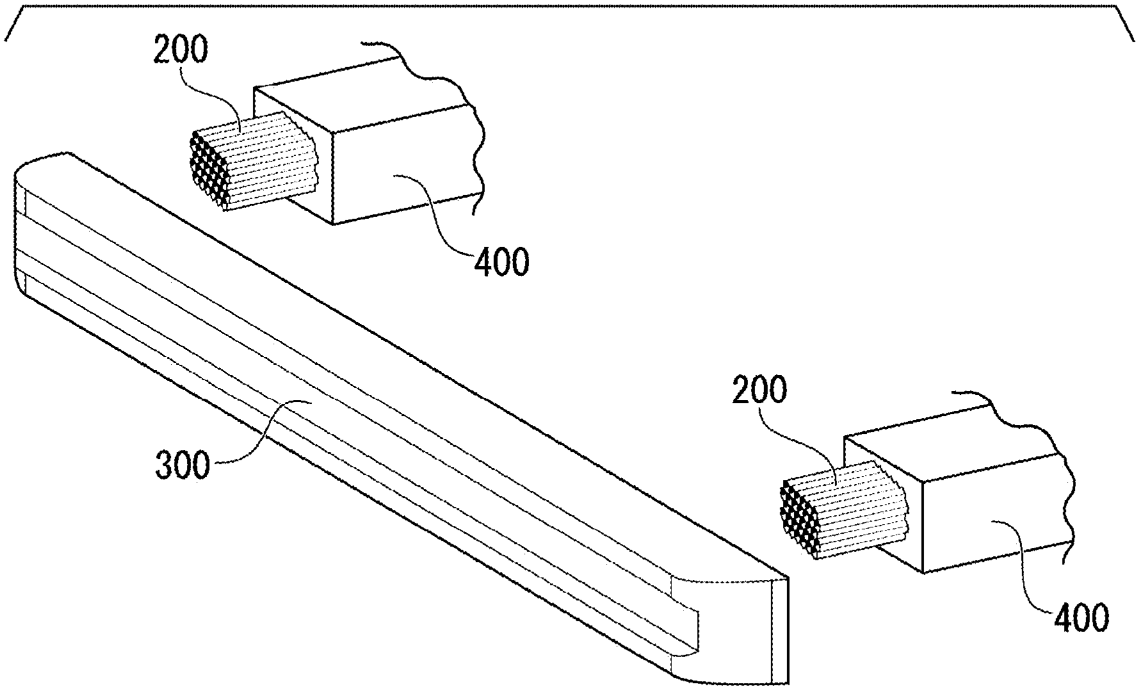
FIG. 1 is a schematic diagram illustrating an example of a state in which a shock-absorbing member of the present embodiment is installed in a vehicle.

FIG. 1 is a schematic diagram illustrating an example of a state in which a shock-absorbing member of the present embodiment is installed in a vehicle as a crash box.

In FIG. 1, the shock-absorbing member 200 of the present embodiment is installed between a front side member 400 (frame) that extends in the longitudinal direction of a vehicle and a bumper beam 300.

In a vehicle in which the shock-absorbing member 200 is installed, the shock-absorbing member 200 crushes in the front-back direction thereof to absorb an impact energy when a compression force is applied to the vehicle in the front-back direction thereof along with a collision.

Hereinafter, the shock-absorbing member of the present embodiment will be explained sequentially with reference to the drawings. In all of the drawings below, the dimension and proportion of each component appropriately differ from the actual dimension for the sake of easy viewing of the drawings.

The shock-absorbing member of the present embodiment includes a molded part containing a thermoplastic resin. The molded part includes a main part having a honeycomb structure filled with plural tubular cells. A part or all of the tubular cells constituting the honeycomb structure is arrayed via cell walls of which the thickness gradient ($|t2-t1|/h$) determined by the below-mentioned [method of calculating a cell wall thickness gradient] satisfies a particular relationship.

Figure 2:
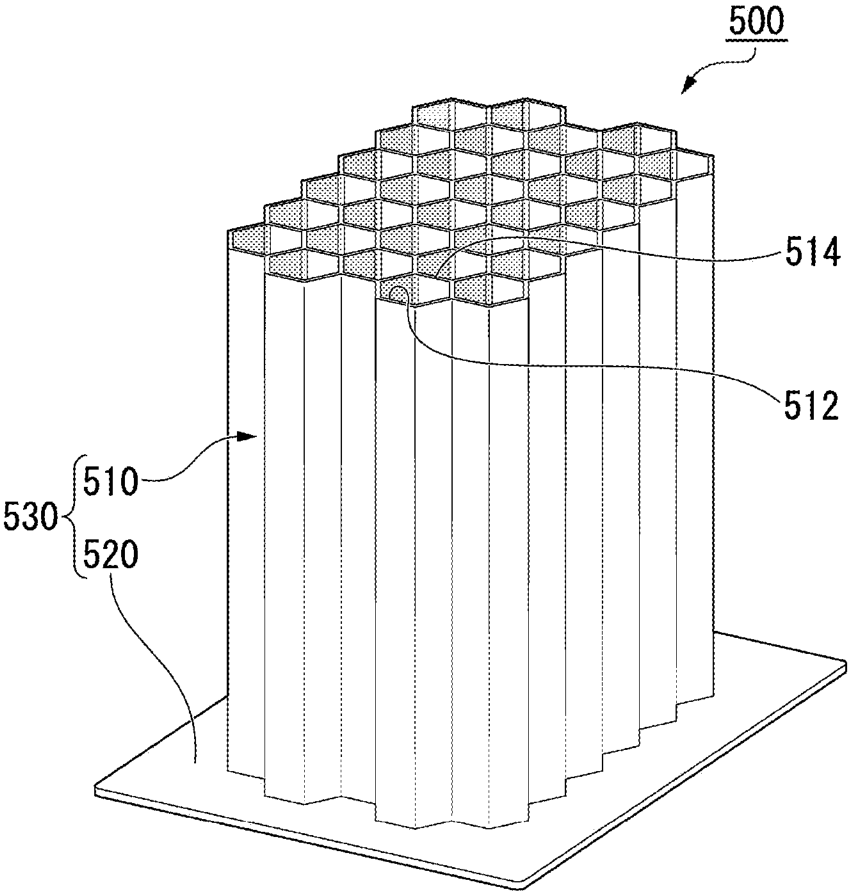
FIG. 2 is a diagrammatic perspective view illustrating an embodiment of a shock-absorbing member.

FIG. 2 is a diagrammatic perspective view indicating an embodiment of the shock-absorbing member.

The shock-absorbing member 500 illustrated in FIG. 2 includes an injection molded part 530 containing a thermoplastic resin and a fibrous filler.

The injection molded part 530 includes a main part 510.

In addition to the main part 510, the injection molded part 530 preferably further includes a flange member 520 integrally molded with the main part 510.

The main part 510 has a honeycomb structure in which plural tubular cells 512 are arrayed without gaps.

The plural tubular cells 512 are preferably formed to protrude from the flange member 520.

The tubular cells 512 may be formed in a bottomed tubular shape in which an end face on the side of the flange member 520 is closed and an end face on the side opposite to the flange member 520 is opened.

In FIG. 2, the honeycomb structure of the main part 510 is composed of 32 pieces of tubular cells 512, each aperture plane of which has a substantially regular hexagonal shape when viewed from the top thereof.

In the shock-absorbing member 500, all of the tubular cells 512 constituting the honeycomb structure are arrayed via cell walls 514 of which the thickness gradient ($|t2-t1|/h$) determined by the following [method of calculating a cell wall thickness gradient] satisfies the following relationship of expression (G).

[Math. 2]

$$62.5\times10^{-4} < \frac{|t2-t1|}{h} < 250\times10^{-4} \tag{G}$$

Figure 3A:
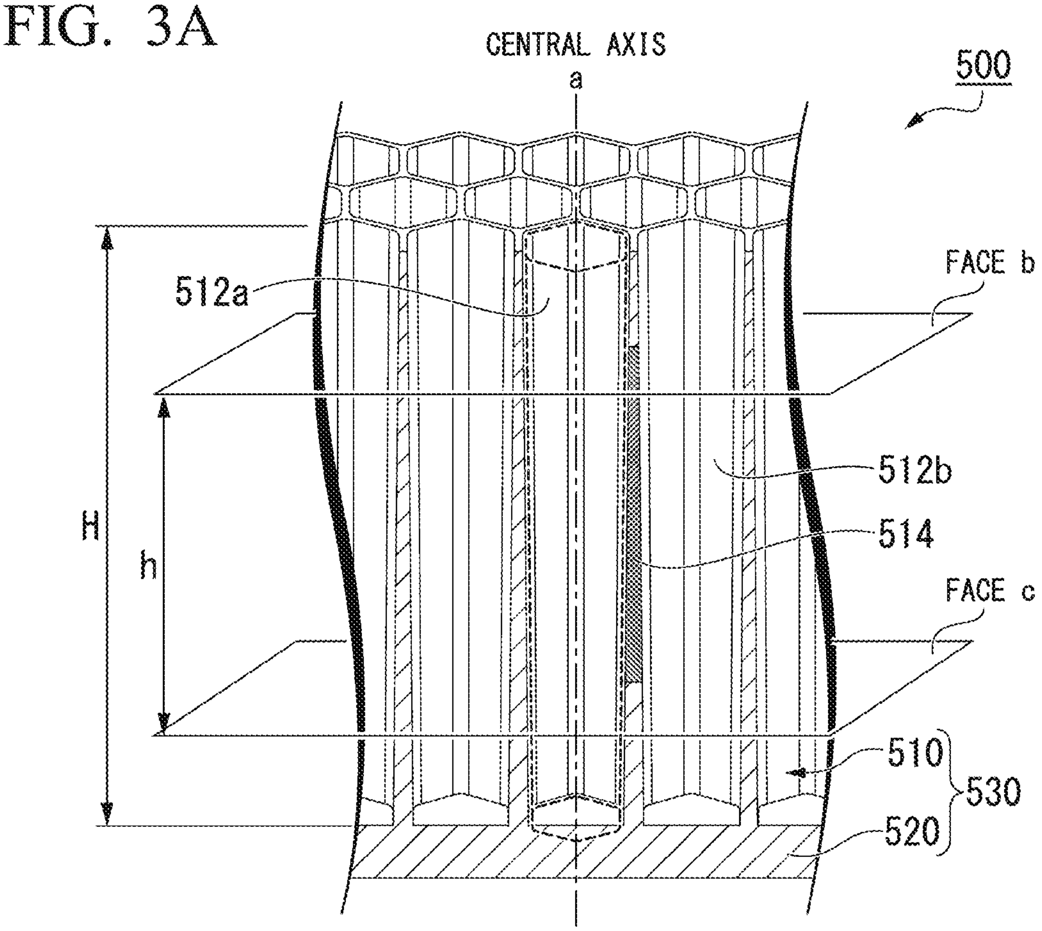
FIG. 3A is a cross-sectional view of a shock-absorbing member 500 in a height direction thereof.
Figure 3B:
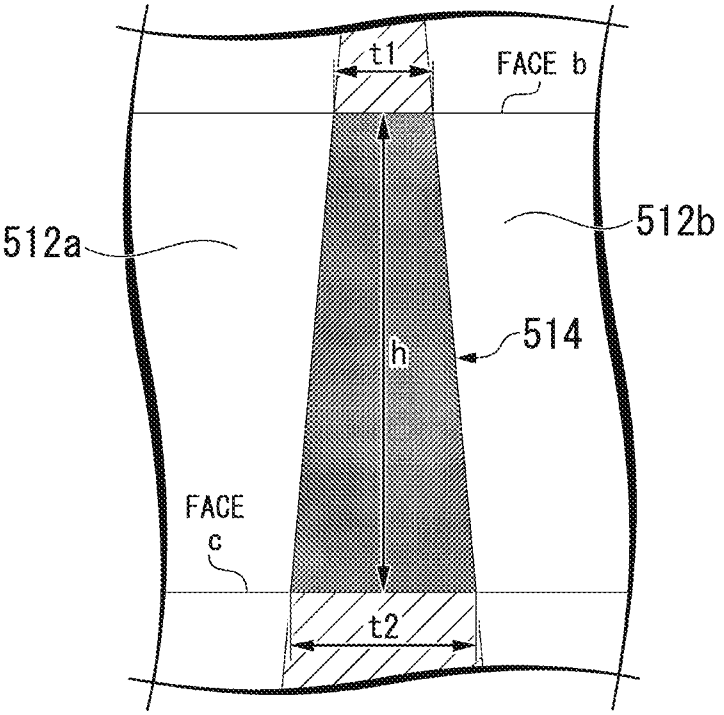
FIG. 3B is a cross-sectional view in which a cell wall 514 in FIG. 3A is partially enlarged.

FIGS. 3A and 3B are drawings that illustrate the [method of calculating a cell wall thickness gradient] in the honeycomb structure of the main part 510.

FIG. 3A is a cross-sectional view in a height direction of the shock-absorbing member 500.

In FIG. 3A, a cell wall 514 is formed by a first tubular cell 512*a* and a second tubular cell 512*b* adjacent thereto.

FIG. 3B is a cross-sectional view in which the cell wall 514 in FIG. 3A is partially enlarged.

The [method of calculating a cell wall thickness gradient] in the honeycomb structure is conducted by the following procedures.

[Method of Calculating a Cell Wall Thickness Gradient]

Procedure 1): A central axis a which passed through a center of gravity at one end face of the first tubular cell 512*a* having a height H on the side of the flange member 520 and a center of gravity at the other end face thereof opposite to the flange member 520.

Procedure 2): Arbitrary two faces b and c perpendicular to the central axis a are set within a range of the height H of the first tubular, and h (unit: mm; $0<h<H$) is determined as a distance between the two faces b and c.

Procedure 3): t1 (unit mm) is determined as a thickness of the cell wall 514 at a position where the cell wall 514 between the first tubular cell 512*a* and a second tubular cell 512*b* adjacent to the first tubular cell 512*a* crosses the face b.

Procedure 4): t2 (unit mm) is determined as a thickness of the cell wall 514 at a position where the cell wall 514 between the first tubular cell 512*a* and the second tubular cell 512*b* adjacent to the first tubular cell 512*a* crosses the face c.

Procedure 5): The thickness gradient of the cell wall 514 is calculated by ($|t2-t1|/h$).

In the shock-absorbing member 500, the thickness gradient $|t2-t1|/h$ of the cell wall 514 is more than $62.5\times10^{-4}$ and less than $250\times10^{-4}$, preferably $65\times10^{4}$ to $200\times10^{-4}$, and even more preferably $100\times10^{-4}$ to $150\times10^{-4}$.

The impact energy absorption capacity can be further enhanced by making the thickness gradient of the cell wall 514 exceed the lower limit. In contrast, the honeycomb structure can be easily molded by making the thickness gradient of the cell wall 514 be less than the upper limit.

The dimension of the shock-absorbing member 500 may be appropriately determined depending on an installing object (such as the type or size of a vehicle), the required impact energy absorption capacity or the like.

For example, the height H of the first tubular cell 512*a* is 20 mm to 200 mm.

In $|t2-t1|/h$, the distance h between two faces b and c is within a range of $0<h<H$, and preferably $H/2<h<4H/5$. It is particularly preferable that the height from the flange member 520 be set such that the midpoint of the height H and the midpoint of the distance h locate at the same position.

The thickness t1 of the cell wall 514 at the location where the cell wall 514 and the face b cross is 0.5 mm to 5 mm, for example.

The thickness t2 of the cell wall 514 at the location where the cell wall 514 and the face c cross is 0.5 mm to 5 mm, for example.

The thickness t1 and the thickness t2 may be $t1>t2$ or $t1<t2$. Namely, in the shock-absorbing member 500, the tubular cell 512 may gradually thicken from the aperture plane side to the side of the flange member 520, or may gradually thicken from the side of the flange member 520 to the aperture plane side. However, the thickness t1 and the thickness t2 preferably satisfy the relation of $t1<t2$ from the viewpoint of moldability of the honeycomb structure.

In the tubular cell 512, the cell inner diameter at an end face (aperture plane) opposite to the flange member 520 is, for example, 5 mm to 50 mm, and is preferably 5 mm to 20 mm. The term "cell inner diameter" refers to a diameter of an inscribed circle of the aperture plane of the tubular cell, and refers to a diameter of an inscribed circle of a substantially regular hexagon when the aperture plane has a substantially regular hexagonal shape.

The thickness of the flange member 520 is 2 mm to 6 mm, for example.

The shock-absorbing member 500 may be produced by using a conventionally-known injection molding machine to melt a resin material, followed by injecting the melted resin material into a mold having a honeycomb structure, for example.

The thickness gradient ($|t2-t1|/h$) of the cell wall 514 may be controlled by the shape of the mold, such as the inner diameter of the tubular cell 512 or the height of the tubular cell 512, for example.

Examples of the conventionally-known injection molding machine include TR450EH3 manufactured by Sodick Co., Ltd., and a hydraulic horizontal molding machine PS40E5ASE manufactured by NISSEI PLASTIC INDUSTRIAL CO., LTD.

The details of the resin material in the present embodiment will be explained later.

The temperature conditions at an injection molding are appropriately determined depending on the type of the thermoplastic resin, and the cylinder temperature of an injection molding machine is preferably set at a temperature higher than the flow starting temperature of a used thermoplastic resin by 10° C. to 80° C.

For example, the melt-kneading temperature in a plasticizing part is preferably 250° C. to 350° C., more preferably 280° C. to 340° C., and even more preferably 290° C. to 330° C. The temperature in a measuring part or a plunger part is preferably 250° C. to 400° C., more preferably 290° C. to 380° C., and even more preferably 300° C. to 370° C.

The temperature of a mold is preferably set at a temperature of room temperature (23° C., for example) to 220° C. from the viewpoint of the cooling rate of the thermoplastic resin and the productivity.

As other injection conditions, a screw rotation speed, a back pressure, an injection speed, a holding pressure, a holding pressure time or the like may be appropriately adjusted.

Although the gate method is not particularly limited in the present embodiment, a direct gate from the vicinity of the center of gravity at the bottom surface of the flange member 520 or a film gate from the side surface of the flange member 520 is preferably adopted from the viewpoint that the generation of weld line is suppressed at the injection molded part 530. The injection molded part 530 can be molded while suppressing the generation of weld line, and an impact energy absorption capacity tends to be further enhanced by adopting the gate method.

In the present embodiment, it is more preferable that a direct gate from the vicinity of the center of gravity at the bottom surface of the flange member 520 be adopted (namely, a gate mark be formed in the vicinity of the center of gravity at the bottom surface of the flange member 520) in the gate method, from the viewpoint of the controllability of variation in fiber length and increase in fiber length in the injection molded part 530.

The shock-absorbing member 500 of the above-mentioned embodiment is provided with a main part 510 containing a thermoplastic resin and a fibrous filler. Therefore, the shock-absorbing member 500 is lightweight and saves fuel consumption in comparison with a conventional shock-absorbing member made from a metal material.

In addition, the shock-absorbing member 500 is provided with the main part 510 having a honeycomb structure filled with plural tubular cells 512, and the tubular cells 512 are arrayed via cell walls 514 having a thickness gradient ($|t2-t1|/h$) of more than $62.5\times10^{-4}$ and less than $250\times10^{-4}$, the thickness gradient ($|t2-t1|/h$) being determined by the above-mentioned [method of calculating a cell wall thickness gradient]. Therefore, the shock-absorbing member 500 makes it possible to further enhance the impact energy absorption capacity and improve the collision safety.

The honeycomb structure of the main part 510 in the shock-absorbing member 500 of the above-mentioned embodiment may include an outer layer surrounding the side surface thereof.

The flange member 520 in the shock-absorbing member 500 may be processed to allow an installation thereof to another structural member. For example, the flange member 520 may be provided with at least one through-hole at regular intervals to allow an installation thereof to another structural member using a bolt.

In addition, the main part 510 in the shock-absorbing member 500 may also be processed in the vicinity of the upper side surface of the main part 510 to allow an installation thereof to another structural member.

OTHER EMBODIMENTS

A shock-absorbing member of one aspect of the present invention is not limited to the above-mentioned embodiment, and may be another embodiment.

Although the above-mentioned shock-absorbing member 500 is an embodiment in which the tubular cells 512 constituting a honeycomb structure are entirely arrayed via cell walls 514 of which the thickness gradient ($|t2-t1|/h$) satisfies the relationship of expression (G), a shock-absorbing member is not limited thereto, and may be an embodiment in which the tubular cells 512 constituting a honeycomb structure are partially arrayed via cell walls 514 of which the thickness gradient ($|t2-t1|/h$) satisfies the relationship of expression (G).

The amount of the tubular cells 512 arrayed via the cell walls 514 that satisfy the relationship of expression (G) based on the total amount of the tubular cells 512 constituting a honeycomb structure is preferably 70% to 100%, and more preferably 90% to 100%.

Although the above-mentioned shock-absorbing member 500 includes an injection molded part, a shock-absorbing member is not limited thereto, and may include, for example, a molded part processed from an extruded sheet. However, it is preferable to include an injection molded part from a viewpoint of enhanced impact energy absorption capacity, strength, and ease in molding.

In the above-mentioned shock-absorbing member 500, although the aperture plane of the tubular cell 512 in the honeycomb structure of the main part 510 has a substantially regular hexagonal shape when viewed from the topside thereof, the shape is not limited thereto, and may be another shape, as long as the tubular cells can be arrayed via cell walls, the thickness gradient ($|t2-t1|/h$) of which satisfies the relationship of expression (G).

Figure 4A:
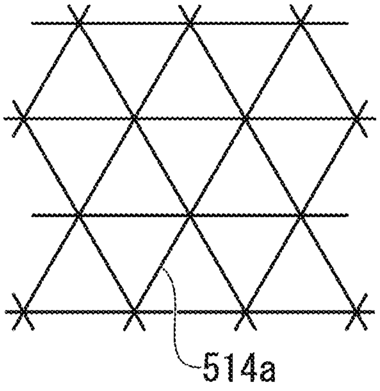
FIG. 4A is a plane view (top view) illustrating an embodiment of a honeycomb structure which can be applied to a shock-absorbing member and is constituted by tubular cells, each aperture plane of which has a substantially equilateral triangular shape.
Figure 4B:
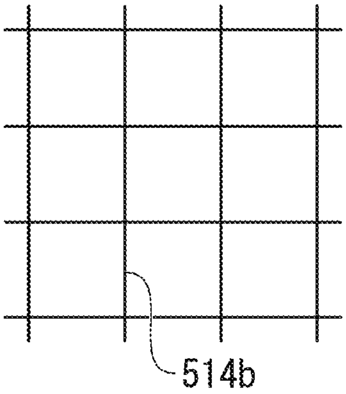
FIG. 4B is a plane view (top view) illustrating an embodiment of a honeycomb structure which can be applied to a shock-absorbing member and is constituted by tubular cells, each aperture plane of which has a substantially square shape.
Figure 4C:
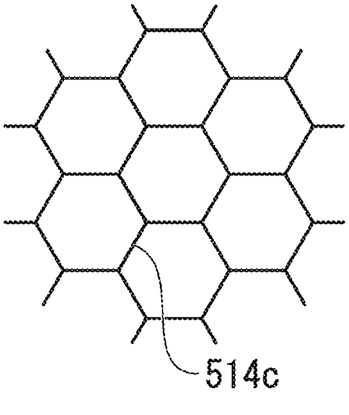
FIG. 4C is a plane view (top view) illustrating an embodiment of a honeycomb structure which can be applied to a shock-absorbing member and is constituted by tubular cells, each aperture plane of which has a substantially regular hexagonal shape.

FIGS. 4A, 4B, and 4C are plane views (top views) illustrating embodiments of the honeycomb structure applicable to the shock-absorbing member.

FIG. 4A illustrates an embodiment in which the aperture plane of the tubular cell constituting a honeycomb structure has a substantially equilateral triangular shape. The reference numeral 514*a* indicates a cell wall.

FIG. 4B illustrates an embodiment in which the aperture plane of the tubular cell constituting a honeycomb structure has a substantially square shape. The reference numeral 514*b* indicates a cell wall.

FIG. 4C illustrates an embodiment in which the aperture plane of the tubular cell constituting a honeycomb structure has a substantially regular hexagonal shape. The reference numeral 514*c* indicates a cell wall.

In the case where the aperture plane of the tubular cell 512 of a honeycomb structure in the main part 510 of the shock-absorbing member 500 has a shape having vertices, such as a substantially regular polygonal shape, when viewed from the topside thereof, the curvature radius of the vertices is preferably 0.5 mm or more.

The term "curvature radius of the vertices" used herein refers to the radius of a circle when it is assumed that a minute portion including the vertices is approximated to a circular arc.

Although the honeycomb structure of the main part 510 in the shock-absorbing member 500 described above is composed of 32 pieces of tubular cells 512, the honeycomb structure is not limited thereto, and the number of the tubular cells may be appropriately determined depending on an installing object (such as a type or a size of a vehicle) or required impact energy absorption capacity. For example, the number of the tubular cells is within a range of 10 to 70. The inner diameter of the aperture plane of the tubular cell may also be appropriately determined in a similar manner to the number of the tubular cells.

Although the shock-absorbing member 500 described above includes an injection molded part 530 containing a thermoplastic resin and a fibrous filler, the shock-absorbing member is not limited thereto, and may not contain any fibrous fillers. However, the impact energy absorption capacity is further enhanced and the durability is improved by including a fibrous filler in addition to a thermoplastic resin in a molded part.

<Resin Material>

An injection molded part 530 in the shock-absorbing member 500 of the present embodiment contains a thermoplastic resin and a fibrous filler.

In the injection molded part 530, the ratio (mass ratio) of the thermoplastic resin and the fibrous filler is preferably 40 parts by mass to 75 parts by mass of the thermoplastic resin and 25 parts by mass to 60 parts by mass of the fibrous filler, more preferably 45 parts by mass to 75 parts by mass of the thermoplastic resin and 25 parts by mass to 55 parts by mass of the fibrous filler, more preferably 45 parts by mass to 70 parts by mass of the thermoplastic resin and 30 parts by mass to 55 parts by mass of the fibrous filler, and particularly preferably 50 parts by mass to 70 parts by mass of the thermoplastic resin and 30 parts by mass to 50 parts by mass of the fibrous filler.

When the ratio of the fibrous filler is the lower limit or more of the above-mentioned preferable rang, effects of improving the strength of the injection molded part due to the fibrous filler can be exhibited. In contrast, when the ratio of the fibrous filler is the upper limit or less of the above-mentioned preferable rang, the fibrous filler tends to be dispersed in the thermoplastic resin, and fiber breakage due to collision between fibers during injection molding is less likely to occur.

In the injection molded part 530, the total amount of the thermoplastic resin and the fibrous filler based on the total amount (100% by mass) of the injection molded part is preferably 80% by mass or more, more preferably 90% by mass or more, and even more preferably 95% by mass or more, and may be 100% by mass.

<<Thermoplastic Resin>>

Examples of the thermoplastic resin in the present embodiment include liquid-crystal polyester resins, polyamides, polypropylenes, polyesters other than liquid crystal polyester resins, polysulfones, polyethersulfones, polyphenylenesulfides, polyetherketones, polyetheretherketones, polycarbonates, polyphenylene ethers, and polyetherimides. Among these, liquid crystal polyester resins, polyamides, and polypropylenes are preferably used from the viewpoint of the impact energy absorption capacity. Among them, liquid crystal polyester resins are particularly preferably used from the viewpoint of a low dependence on water absorption and a higher impact energy absorption capacity in a moisture-absorbing state.

Examples of the polyamides include nylon 6 (PA 6), nylon 66, nylon 11, nylon 12, nylon 46, nylon 610, polytetramethylene terephthalamide (nylon 4T), polyhexamethylene terephthalamide (nylon 6T), polymetaxylylene adipamide (nylon MXD6), polynonamethylene terephthalamide (nylon 9T), and polydecamethylene terephthalamide (nylon 10T).

Regarding the Liquid Crystal Polyester Resin:

In the present embodiment, a liquid crystal polyester resin is a polyester which exhibits liquid crystallinity in a molten state, and preferably melts at a temperature of 400° C. or lower.

A preferable liquid crystal polyester resin contained in a molded part in the shock-absorbing member may be a liquid crystal polyesteramide, a liquid crystal polyester ether, a liquid crystal polyester carbonate, or a liquid crystal polyesterimide.

The liquid crystal polyester resin is preferably a wholly aromatic liquid crystal polyester formed using only aromatic compounds as raw material monomers.

Typical examples of the liquid crystal polyester resin include: ones obtained by polymerization (polycondensation) of an aromatic hydroxycarboxylic acid, an aromatic dicarboxylic acid, and at least one compound selected from the group consisting of aromatic diols, aromatic hydroxylamines, and aromatic diamines; ones obtained by polymerization of plural aromatic hydroxycarboxylic acids; ones obtained by polymerization of an aromatic dicarboxylic acid and at least one compound selected from the group consisting of aromatic diols, aromatic hydroxyamines and aromatic diamines; and ones obtained by polymerization of a polyester such as polyethylene terephthalate with an aromatic hydroxycarboxylic acid.

The aromatic hydroxycarboxylic acids, aromatic dicarboxylic acids, aromatic diols, aromatic hydroxyamines and aromatic diamines may be each independently replaced with polymerizable derivatives thereof in a part or in a whole thereof.

Examples of the polymerizable derivative of the compound having a carboxyl group such as an aromatic hydroxycarboxylic acid or an aromatic dicarboxylic acid include: esters obtained by replacing a carboxyl group with an alkoxycarbonyl group or an aryloxycarbonyl group; acid halides obtained by replacing a carboxyl group with a haloformyl group; and acid anhydrides obtained by replacing a carboxyl group with an acyloxycarbonyl group. Examples of the polymerizable derivative of the compound having a hydroxyl group such as an aromatic hydroxycarboxylic acid, an aromatic diol or an aromatic hydroxylamine include acylated products obtained by acylating a hydroxyl group to an acyloxy group. Examples of the polymerizable derivative of the compound having an amino group such as an aromatic hydroxylamine or an aromatic diamine include acylated products obtained by acylating an amino group to an acylamino group.

The liquid crystal polyester resin preferably has a repeating unit of the following formula (1) (hereinafter, may be abbreviated as "repeating unit (1)"), and more preferably has the repeating unit (1), a repeating unit of the following formula (2) (hereinafter, may be abbreviated as "repeating unit (2)") and a repeating unit of the following formula (3) (hereinafter, may be abbreviated as "repeating unit (3)").

$$-O-Ar^1-CO- \quad (1)$$

$$-CO-Ar^2-CO- \quad (2)$$

$$-X-Ar^3-Y- \quad (3)$$

($Ar^1$ is a phenylene group, a naphthylene group or a biphenylene group. $Ar^2$ and $Ar^3$ are each independently a phenylene group, a naphthylene group, a biphenylene group or a group of the following formula (4). X and Y are each independently an oxygen atom or an imino group (—NH—). Any hydrogen atoms in $Ar^1$, $Ar^2$ or $Ar^3$ may be each independently replaced with a halogen atom, an alkyl group or an aryl group.)

$$—Ar^4—Z—Ar^5— \quad (4)$$

($Ar^4$ and $Ar^5$ are each independently a phenylene group or a naphthylene group. Z is an oxygen atom, a sulfur atom, a carbonyl group, a sulfonyl group or an alkylidene group.)

Examples of the halogen atom include a fluorine atom, a chlorine atom, a bromine atom and an iodine atom. Examples of the alkyl group include a methyl group, an ethyl group, a n-propyl group, an isopropyl group, a n-butyl group, an isobutyl group, a s-butyl group, a t-butyl group, a n-hexyl group, a 2-ethylhexyl group, a n-octyl group and a n-decyl group, and the carbon number thereof is preferably 1 to 10. Examples of the aryl group include a phenyl group, an o-tolyl group, a m-tolyl group, a p-tolyl group, a 1-naphthyl group and a 2-naphthyl group, and the carbon number thereof is preferably 6 to 20.

When the hydrogen atoms are replaced with these groups, the number thereof per group of $Ar^1$, $Ar^2$ or $Ar^3$ is each independently and preferably 2 or less, and more preferably 1 or less.

Examples of the alkylidene group include a methylene group, an ethylidene group, an isopropylidene group, a n-butylidene group and a 2-ethylhexylidene group, and the carbon number thereof is preferably 1 to 10.

The repeating unit (1) is a repeating unit derived from a predetermined aromatic hydroxycarboxylic acid. The repeating unit (1) is preferably a repeating unit (1) in which $Ar^1$ is a 1,4-phenylene group (a repeating unit derived from a p-hydroxybenzoic acid) or a repeating unit (1) in which $Ar^1$ is a 2,6-naphthylene group (a repeating unit derived from a 6-hydroxy-2-naphthoic acid).

In the present specification, the term "derived from" means that the chemical structure of a functional group contributing to polymerization of raw material monomers changes due to the polymerization, and other structural change does not occur.

The repeating unit (2) is a repeating unit derived from a predetermined aromatic dicarboxylic acid. The repeating unit (2) is preferably a repeating unit (2) in which $Ar^2$ is a 1,4-phenylene group (a repeating unit derived from a terephthalic acid), a repeating unit (2) in which $Ar^2$ is a 1,3-phenylene group (a repeating unit derived from an isophthalic acid), a repeating unit (2) in which $Ar^2$ is a 2,6-naphthylene group (a repeating unit derived from a 2,6-naphthalenedicarboxylic acid), or a repeating unit (2) in which $Ar^2$ is a diphenyl ether-4,4'-diyl group (a repeating unit derived from a diphenyl ether-4,4'-dicarboxylic acid).

The repeating unit (3) is a repeating unit derived from a predetermined aromatic diol, aromatic hydroxylamine or aromatic diamine. The repeating unit (3) is preferably a repeating unit (3) in which $Ar^3$ is a 1,4-phenylene group (a repeating unit derived from a hydroquinone, a p-aminophenol or a p-phenylenediamine), or a repeating unit (3) in which $Ar^3$ is a 4,4'-biphenylene group (a repeating unit derived from a 4,4'-dihydroxybiphenyl, a 4-amino-4'-hydroxybiphenyl or a 4,4'-diaminobiphenyl).

The amount of the repeating unit (1) based on the total amount of all repeating units is preferably 30% by mol or more, more preferably 30% by mol to 80% by mol, even more preferably 40% by mol to 70% by mol, and particularly preferably 45% by mol to 65% by mol. In the present specification, the term "the total amount of all repeating units" means the sum of each substantial amount (mol) of substance of each repeating unit, obtained by dividing each mass of each repeating unit constituting a liquid crystal polyester resin by each formula weight of each repeating unit.

The amount of the repeating unit (2) based on the total amount of all repeating units is preferably 35% by mol or less, more preferably 10% by mol to 35% by mol, even more preferably 15% by mol to 30% by mol, and particularly preferably 17.5% by mol to 27.5% by mol.

The amount of the repeating unit (3) based on the total amount of all repeating units is preferably 35% by mol or less, more preferably 10% by mol to 35% by mol, even more preferably 15% by mol to 30% by mol, and particularly preferably 17.5% by mol to 27.5% by mol.

The larger the amount of the repeating unit (1), the more easily improved the melt flowability, the heat resistance, the strength and the rigidity. However, an excessive amount of the repeating unit (1) readily increases the melt temperature, the melt viscosity, and the temperature required to conduct molding.

The ratio of the amount of the repeating unit (2) to the amount of the repeating unit (3), indicated by "the amount of the repeating unit (2)"/"the amount of the repeating unit (3)" (mol/mol), is preferably 0.9/1 to 1/0.9, more preferably 0.95/1 to 1/0.95, and even more preferably 0.98/1 to 1/0.98.

The preferable liquid crystal polyester resin contained in a molded part of the shock-absorbing member may contain at least two of each of the repeating units (1) to (3) independently. Although the liquid crystal polyester resin may contain repeating units other than the repeating units (1) to (3), the amount thereof based on the total amount of all repeating units is preferably 10% by mol or less, and more preferably 5% by mol or less.

The liquid crystal polyester resin preferably includes a repeating unit (3) in which both X and Y are oxygen atoms, namely a repeating unit derived from a predetermined aromatic diol, and more preferably includes only a repeating unit (3) in which both X and Y are oxygen atoms as the repeating unit (3) from the viewpoint that the melt viscosity is readily decreased.

The liquid crystal polyester resin is preferably produced by melt-polymerizing raw material monomers corresponding to the repeating units constituting the liquid crystal polyester resin, followed by subjecting the resultant polymer (hereinafter, may be referred to as "prepolymer") to solid phase polymerization. Thus, it becomes possible to produce a high-molecular liquid crystal polyester resin having a high heat resistance and a high strength/rigidity with good handleability.

The melt polymerization may be carried out in the presence of a catalyst. Examples of the catalyst include: metal compounds such as magnesium acetate, stannous acetate, tetrabutyl titanate, lead acetate, sodium acetate, potassium acetate and antimony trioxide; and nitrogen-containing heterocyclic compounds such as 4-(dimethylamino)pyridine and 1-methylimidazole. Among them, nitrogen-containing heterocyclic compounds are preferably used.

The flow starting temperature of the liquid crystal polyester resin contained in the molded part of the shock-absorbing member is preferably 260° C. or more, more preferably 260° C. to 400° C., and even more preferably 260° C. to 380° C.

The higher the flow starting temperature of the liquid crystal polyester resin, the stronger the tendency of the liquid crystal polyester resin to have improved heat resistance and strength. In contrast, when the flow starting temperature of the liquid crystal polyester resin exceeds 400° C., the melt temperature and the melt viscosity of the liquid crystal polyester resin tend to become high. Thus, the temperature required to mold the liquid crystal polyester resin tends to become high.

In the present specification, the flow starting temperature of the liquid crystal polyester resin is also referred to as flow temperature or fluidizing temperature, and is a temperature that gives a guide of the molecular weight of a liquid crystal polyester resin (see "Liquid Crystal Polymers-Synthesis, Molding, and Applications-", edited by Naoyuki Koide, CMC Publishing Co., Ltd., Jun. 5, 1987, p 95).

Regarding the method of measuring the flow starting temperature:

The term "flow starting temperature" refers to a temperature at which the viscosity of a liquid crystal polyester resin reaches 4800 Pas (48000 poises) as measured by melting the liquid crystal polyester resin while increasing the temperature thereof at a rate of 4° C./min under a load of 9.8 MPa (100 kg/cm$^2$) to extrude the resultant from a nozzle having an inner diameter of 1 mm and a length of 10 mm, using a capillary rheometer.

In the present embodiment, one of the liquid crystal polyester resins may be used alone, or at least two thereof may be used in combination.

When at least two of the liquid crystal polyester resins are used in combination, liquid crystal polyester resins having a flow starting temperature different from each other are preferably used.

In the thermoplastic resin contained in the molded part of the shock-absorbing member, the amount of the liquid crystal polyester resin based on the total amount (100% by mass) of the thermoplastic resin is 10% by mass or more, preferably 25% by mass or more, more preferably 50% by mass or more, even more preferably 75% by mass or more, and particularly preferably 90% by mass or more, and may be 100% by mass.

In the molded part of the shock-absorbing member, the amount of the liquid crystal polyester resin based on the total amount (100% by mass) of the molded part is preferably 40% by mass to 75% by mass, more preferably 45% by mass to 75% by mass, even more preferably 45% by mass to 70% by mass and particularly preferably 50% by mass to 70% by mass.

<<Fibrous Filler>>

A fibrous filler contained in the molded part of the shock-absorbing member may be an inorganic fibrous filler or an organic fibrous filler.

Examples of the inorganic fibrous filler include: glass fibers; carbon fibers such as PAN-based, pitch-based, rayon-based, phenol-based, and lignin-based carbon fibers; ceramic fibers such as silica fibers, alumina fibers, and silica alumina fibers; metal fibers, such as iron, gold, copper, aluminum, brass, or stainless steel fibers; silicon carbide fibers and boron fibers. Additional examples of the inorganic fibrous filler include whiskers such as potassium titanate whiskers, barium titanate whiskers, wollastonite whiskers, aluminum borate whiskers, silicon nitride whiskers, and silicon carbide whiskers.

Examples of the organic fibrous filler include polyester fibers, para- or meta-aramide fibers, and polyparaphenylene benzobisoxazole (PBO) fibers.

At least one selected from the group consisting of carbon fibers such as PAN-based carbon fibers and pitch-based carbon fibers and glass fibers is more preferably contained as the fibrous filler from the viewpoint of the abrasion load applied on a device during a molding process and the availability thereof. Alternatively, a fibrous filler coated with metal such as nickel, copper, or ytterbium may be used to impart conductivity.

The tensile strength of the carbon fibers is preferably 2000 MPa or more, more preferably 3000 MPa or more, and even more preferably 4000 MPa or more. In addition, the tensile elongation of the carbon fibers is preferably 0.5% or more, more preferably 1.0% or more, and even more preferably 1.8% or more. The use of carbon fibers having a high tensile strength and high tensile elongation as fibrous fillers suppresses the breakage of fibers during a forming process until a molded part is formed, and leaves the fibers long, thereby facilitating the achievement of the effects of the present invention.

Among them, the PAN-based carbon fibers are preferably used from the viewpoint that the PAN-based carbon fibers realize a good balance among tensile strength, tensile elasticity, and tensile elongation, and make it possible to maintain the long length of the residual fibers.

Examples of the PAN-based carbon fibers include "TORAYCA (registered trademark)" manufactured by TORAY INDUSTRIES. INC., "PYROFIL (registered trademark)" manufactured by Mitsubishi Chemical Corporation, and "Tenax (registered trademark)" manufactured by TEIJIN LIMITED.

Examples of the pitch-based carbon fibers include "DIALEAD (registered trademark)" manufactured by Mitsubishi Chemical Corporation, "GRANOC (registered trademark)" manufactured by Nippon Graphite Fiber Co., Ltd., "DONACARBO (registered trademark)" manufactured by Osaka Gas Chemical Co., Ltd., and "KRECA (registered trademark)" manufactured by KUREHA CORPORATION.

Examples of the glass fibers include FRP reinforcing glass fibers such as E glass (namely, alkali-free glass), S glass or T glass (namely, high-strength and high-elastic glass), C glass (namely, acid-resistant glass), D glass (namely, low-permittivity glass), ECR glass (namely, substitute of E glass, the substitute being free from $B_2O_3$ and $F_2$), and AR glass (namely, alkali-resistant glass).

In the molded part of the shock-absorbing member, glass fibers are preferably used as the fibrous fillers from the viewpoint of the balance between the impartation of the strength against an impact load and the degree of elasticity, and easy availability. Among these, E glass is particularly preferable.

The length-weighted average fiber length of the fibrous filler in the molded part of the shock-absorbing member is preferably 0.5 mm or more, more preferably 1.0 mm or more, and even more preferably 1.5 mm or more.

When the length-weighted average fiber length of the fibrous filler is the lower limit or more of the above-mentioned preferable range, the dependency on angle against impact is low, and the impact energy absorption amount is likely to be increased regardless of the impact angle. Furthermore, scattering of fragments when destroyed by collision is further suppressed.

In contrast, the length-weighted average fiber length of the fibrous filler in the molded part is preferably 20 mm or less, more preferably 15 mm or less, even more preferably 10 mm or less, and particularly preferably 8 mm or less.

When the length-weighted average fiber length of the fibrous filler is the upper limit or less of the above-mentioned preferable range, the melt flowability of the resin composition is improved in injection molding, and it becomes easy to reduce the thickness of cell walls and the inner diameter of cells in the honeycomb structure.

The length-weighted average fiber length of the fibrous filler in the molded part is preferably 0.5 mm to 20 mm, more preferably 1.0 mm to 15 mm, even more preferably 1.5 mm to 15 mm, particularly preferably 1.5 mm to 10 mm, and most preferably 1.5 mm to 8 mm.

[Measurement of the Length-Weighted Average Fiber Length of the Fibrous Filler Contained in the Molded Part]

The length-weighted average fiber length of the fibrous filler contained in the molded part is determined by the following procedures.

Procedure (1): A test piece having a maximum length (length at the longest portion in the projection plane of the test piece) of 20 mm or more, a maximum perpendicular length (length at the longest portion in a direction of 90° against the maximum length) of 20 mm or more, and a test piece-projected area of 200 $mm^2$ or more is cut from an outermost wall of the main part.

Procedure (2): The test piece is heated in a muffle furnace at 500° C. to 600° C. for 1 hour to 4 hours to remove a resin component.

Procedure (3): The resultant (only fibers) obtained by removing the resin component from the cut test piece in the procedure (2) is dispersed in 1000 mL of an aqueous solution containing 0.05% by volume of a surfactant (Micro 90 manufactured by INTERNATIONAL PRODUCTS CORPORATION) to obtain a dispersion liquid.

Procedure (4): One hundred milliliters of the dispersion liquid is taken out, and diluted 5 to 15 times with pure water. 50 mL of the diluted dispersion liquid is taken out and dispersed in a petri dish, and then fibers dispersed in the petri dish are observed with a microscope (VH-ZST (manufactured by KEYENCE CORPORATION) at a magnification of 20 times). Ten images are taken for each sample so that the taken areas do not overlap.

Procedure (5): The lengths of all fibers present in one taken image are measured with a measurement tool of the microscope. The length of a bent fiber is measured by a multi-point measurement. The same operation is sequentially conducted on 10 taken images to measure the length of the fibers until the total measured number of fibers exceeds 500.

Procedure (6): The length-weighted average fiber length (lm) of the fibrous filler contained in a molded part is obtained from the fiber length of the fibers measured in the procedure (5) ($\Sigma ni>500$).

$$Lm = (\Sigma li^2 \times ni)/(\Sigma li \times ni)$$

li: Fiber length of fibrous filler ni: Number of fibrous filler, the fiber length of which is li.

In a molded part of the shock-absorbing member, the amount of the fibrous filler based on the total mass (100% by mass) of the molded part is preferably 25% by mass to 60% by mass, more preferably 30% by mass to 55% by mass, and even more preferably 30% by mass to 50% by mass.

<<Other Components>>

The molded part of the shock-absorbing member may include, in addition to the thermoplastic resin and the fibrous filler, at least one of other fillers and additives, as needed.

Examples of the other fillers include plate-shaped fillers, spherically-shaped fillers, and other granular fillers. The other fillers may be inorganic fillers or organic fillers.

Examples of the plate-shaped inorganic fillers include talc, mica, graphite, wollastonite, glass flake, barium sulfate, and calcium carbonate. Mica may be muscovite, phlogopite, fluorophlogopite, or tetrasilicic mica.

Examples of the granular inorganic fillers include silica, alumina, titanium oxide, glass beads, glass balloon, boron nitride, silicon carbide, and calcium carbonate.

Examples of the additives include measurement stabilizers, flame retardants, conductivity-imparting agents, crystal nucleating agents, ultraviolet absorbers, antioxidants, damping materials, antibacterial agents, insect repellent, deodorants, color protection agents, thermal stabilizers, release agents, antistatic agents, plasticizers, lubricants, colorants, pigments, dyes, foaming agents, antifoaming agents, viscosity modifiers, and surfactants.

In the present embodiment, a resin composition containing a thermoplastic resin and a fibrous filler is used as a resin material, for example. The form of the resin composition is not particularly limited, and examples thereof include: a powdery mixture composed of a thermoplastic resin and a fibrous filler and, as needed, other components; and pellets such as a resin pellet, and a neat pellet.

A pellet is preferably used as a resin material to produce the shock-absorbing member of the present embodiment, from the viewpoint of controllability of variation in fiber length, and elongation of the fiber length in a molded part.

It is particularly preferable that a pellet mixture obtained in the following "step of obtaining a pellet mixture" be used as the pellet, for example.

[Step of Obtaining a Pellet Mixture]

A pellet mixture is obtained by mixing a first pellet and a second pellet in a step of obtaining a pellet mixture according to the present embodiment.

The first pellet is composed of a resin structure in which the fibrous fillers are impregnated with a first thermoplastic resin.

The first pellet is obtained as a pellet in a state in which the fibrous fillers are cured with the first thermoplastic resin by, for example, melt-kneading the first thermoplastic resin, and, as needed, other components, followed by impregnating the fibrous fillers with the resultant melt to be pelletized.

Figure 5:
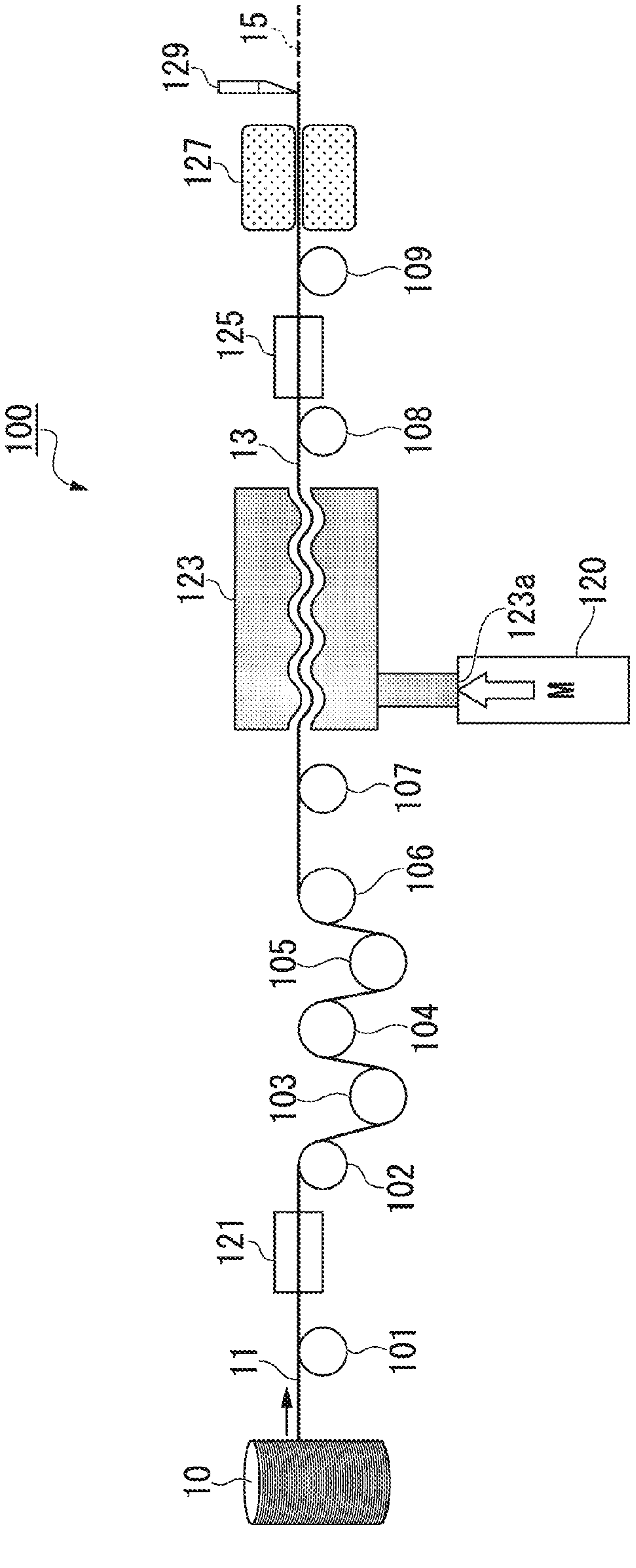
FIG. 5 is a schematic diagram illustrating an example of a manufacturing machine of a first pellet.

FIG. 5 illustrates an embodiment of a manufacturing machine of the first pellet.

In the present embodiment illustrated in FIG. 5, the case in which pellets 15 formed from the first thermoplastic resin composition are obtained using a fiber roving 10 in which a fiber bundle 11 obtained by sizing plural fibrous fillers with a sizing-agent is reeled into a roll will be described.

As shown in FIG. 5, a manufacturing machine 100 includes: a preheating unit 121, an impregnation unit 123, a cooling unit 125, a taking-up unit 127, a cutting unit 129, and transfer rolls 101 to 109. In the manufacturing machine 100 shown in FIG. 5, an extruder 120 is connected to the impregnation unit 123.

FIG. 5 shows the process in which the fiber bundle 11 is continuously reeled out from the fiber roving 10. In the present embodiment, the pellets 15 formed from the first thermoplastic resin composition are prepared while conveying the fiber bundle 11 reeled out from the fiber roving 10 in the longitudinal direction by the transfer rolls 101 to 109.

Although the fineness of the fiber roving 10 used to produce the first pellet of the present embodiment is not particularly limited, the fineness is preferably 200 g/1000 m or more, more preferably 500 g/1000 m or more, and even more preferably 800 g/1000 m or more. When the fineness of the fiber roving 10 is the lower limit or more of the above-mentioned preferable range, the fiber roving 10 can be readily handled in the production method of the first pellet.

In addition, the fineness of the fiber roving 10 is preferably 3750 g/1000 m or less, more preferably 3200 g/1000 m or less, and even more preferably 2500 g/1000 m or less. When the fineness of the fiber roving 10 is the upper limit or less of the above-mentioned preferable range, the fibers are readily dispersed in the first thermoplastic resin. Furthermore, the fibers are readily handled when the first pellet is produced.

Namely, the fineness of the fiber roving 10 is preferably 200 g/1000 m to 3750 g/1000 m, and more preferably 800 g/1000 m to 2500 g/1000 m.

Although the number-average fiber diameter of the fiber roving 10 is not particularly limited, the number-average fiber diameter is preferably 1 μm to 40 μm, and more preferably 3 μm to 35 μm.

When the fibrous fillers are carbon fibers, the number-average fiber diameter is preferably 1 μm to 15 μm, more preferably 3 μm to 10 μm, and even more preferably 4 μm to 9 μm.

When the fibrous fillers are glass fibers, the number-average fiber diameter is preferably 5 μm to 35 μm, more preferably 10 μm to 25 μm, and even more preferably 10 μm to 20 μm.

The number-average fiber diameter of the fiber roving 10 is the number-average value of values obtained by observing fibrous fillers with a scanning electron microscope (at a magnification of 1000 times) and measuring fiber diameter of 500 fibrous fillers selected randomly.

When the number-average fiber diameter of the fiber roving 10 is the lower limit or more of the above-mentioned preferable range, the fibrous fillers are readily dispersed in the first pellet, and are readily handled during the production of the first pellet. In contrast, when the number-average fiber diameter of the fiber roving 10 is the upper limit or less of the above-mentioned preferable range, a molded article is effectively reinforced by the fibrous fillers, and therefore excellent impact strength can be imparted to the molded part of the shock-absorbing member.

In the present embodiment, the fibrous fillers treated with a sizing-agent are used. The fibrous fillers that have been appropriately sized exhibit excellent productivity and quality stability when the pellets are produced, and can reduce variations in physical properties in a molded part.

Although the sizing-agent is not particularly limited, examples thereof include nylon-based polymers, polyether-based polymers, epoxy-based polymers, ester-based polymers, urethane-based polymers, mixed polymers thereof, and modified polymers thereof. In addition, a silane coupling agent such as aminosilane or epoxysilane, or a conventionally-known coupling agent such as a titanium coupling agent may also be used.

In the fibrous fillers used in the first pellet of the present embodiment, it is not necessarily required that single fibers be arranged in one direction, but the state in which single fibers are arranged in one direction and the fiber bundle is continuous in the length direction of the fiber is preferable from the viewpoint of productivity in the process of producing a molding material.

When the fibrous fillers are glass fibers, the number of single threads in the fiber roving 10 is preferably 1000 to 10000, more preferably 1000 to 8000, and even more preferably 1500 to 6000 from the viewpoint of economic efficiency and improvement in impregnation efficiency.

When the fibrous fillers are carbon fibers, the number of single threads in the fiber roving 10 is preferably 10000 to 100000, more preferably 10000 to 50000, and even more preferably 10000 to 30000 from the same viewpoint as mentioned above.

In the preheating unit 121, the fiber bundle 11 reeled out from the fiber roving 10 is heated and dried. Although the heating temperature at this time is not particularly limited, the heating temperature is, for example, 50° C. to 250° C.

Although the heating time in the preheating unit 121 is not particularly limited, the heating time is, for example, 3 seconds to 30 seconds.

In the impregnation unit 123, the fiber bundle 11 is impregnated with a molding material M other than the fiber bundle 11 (the molding material M including the first thermoplastic resin and other components blended, as needed).

It is preferable as described below that the first thermoplastic resin be appropriately selected in view of the type, the melt viscosity, and the flow starting temperature of second thermoplastic resin, and the like. Preferable examples of the first thermoplastic resin include liquid crystal polyester resins.

One of the first thermoplastic resins may be used alone or at least two thereof may be used in combination.

The fiber bundle 11 may be impregnated with the melt obtained by supplying the molding material M from a supply port 123*a* into the impregnation unit 123 and then heating the molding material M in the impregnation unit 123, or may be impregnated with the molding material M melt-kneaded by the extruder 120 and then supplied from the supply port 123*a*.

In the embodiment shown in FIG. 5, the resin structure 13 in which the fiber bundle 11 is impregnated and coated with the melt is obtained.

The heating temperature in the impregnation unit 123 is appropriately determined depending on the type of the first thermoplastic resin, and is preferably set to a temperature higher than the flow starting temperature of the used first thermoplastic resin by 10° C. to 80° C., and, for example, is set to 300° C. to 400° C.

In the impregnation unit 123, preferably 40 parts by mass to 250 parts by mass, more preferably 50 parts by mass to 240 parts by mass, and even more preferably 60 parts by mass to 220 parts by mass of the fibrous fillers (the fiber bundle 11) are impregnated with 100 parts by mass of the first thermoplastic resin, depending on the characteristics required on a molded part. When the blended amount of the fibrous fillers is the lower limit or more of the above-mentioned preferable range, the molded part is effectively reinforced by the fibers. In contrast, when the blended amount of the fibrous fillers is the upper limit or less of the above-mentioned preferable range, it becomes easy to open the fiber bundle and to impregnate the fiber bundle with the first thermoplastic resin.

The blended ratio of the fibrous fillers to the first thermoplastic resin in the resin structure 13 may be adjusted by changing the nozzle diameter of a die head at an outlet of the impregnation unit 123 relative to the diameter of the fiber bundle 11.

In the cooling unit 125, the resin structure 13 heated in the impregnation unit 123 (resin structure 13 in which the fiber bundle 11 is impregnated and coated with the melt) is cooled to 50° C. to 150° C., for example. Although the cooling time is not particularly limited, the cooling time is 3 seconds to 30 seconds, for example.

In the taking-up unit 127, the resin structure 13 cooled in the cooling unit 125 is continuously taken up to feed the resin structure 13 to the subsequent cutting unit 129.

In the cutting unit 129, the cooled resin structure 13 is cut to a desired length to obtain pellets 15. The cutting unit 129 is equipped with a rotary blade, for example.

Step of Obtaining the Resin Structure:

First, a fiber bundle 11 is heated and dried in the preheating unit 121 while continuously reeling out the fiber bundle 11 in which plural single fibers are sized by a sizing-agent from a fiber roving 10.

Then, the fiber bundle 11 is impregnated with a molding material M in a molten state by supplying the molding material M melt-kneaded by an extruder 120 from a supply port 123*a* while supplying the dried fiber bundle 11 to the impregnation unit 123. Thus, the resin structure 13 in which the fiber bundle 11 is impregnated and coated with the melt is obtained. Then, the resin structure 13 heated in the impregnation unit 123 is cooled in the cooling unit 125.

In the thus obtained resin structure 13, the fibers are arranged to be approximately parallel to the longitudinal direction of the resin structure 13.

The phrase "the fibers are arranged to be approximately parallel to the longitudinal direction of the resin structure" refers to the state in which the angle formed by the longitudinal direction of the fiber and the longitudinal direction of the resin structure is approximately 0°, and specifically the state in which the angle formed by the longitudinal direction of the fiber and the longitudinal direction of the resin structure is −5° to 5°.

Step of Obtaining Pellets:

Next, the cooled resin structure 13 is taken up by a taking-up unit 127 in a strand shape, and fed to the cutting unit 129.

Then, the strand-shaped resin structure 13 is cut to a predetermined length in the longitudinal direction thereof in the cutting unit 129 to obtain pellets 15.

The term "predetermined length" of the pellets 15 refers to the length of the pellets 15, which is determined depending on the required performance of a molded article formed from the pellets 15. In the first pellet obtained in the production method of the present embodiment, the length of the pellet 15 and the length of the fibers arranged in the pellet 15 are substantially the same.

The phrase "the length of the pellet and the length of the fibers are substantially the same" means that the length-weighted average fiber length of the fibers arranged in the pellet is 95% to 105% of the length of the pellet in the longitudinal direction thereof.

Thus, the first pellets (pellets 15) in which the fibrous fillers are impregnated with the first thermoplastic resin are produced.

In the pellet 15, the fibrous fillers are hardened with the first thermoplastic resin, and the fibrous fillers are arranged to be approximately parallel to the longitudinal direction of the pellet. The length of the fibrous filler arranged in the pellet 15 is substantially the same as the length of the pellet. Although the length of the pellets 15 produced in the present embodiment depends on the required performance of a molded article formed from the pellets 15, the length is 3 mm to 50 mm, for example.

Thus, the fibrous fillers are arranged to be approximately parallel to the longitudinal direction of the pellet, and the length of the fibrous fillers is substantially the same as the length of the pellet, as a result of which, when the pellet is made into a molded part, the length of the fibrous fillers remaining in the molded part can be increased, which is effective in improving the heat resistance of the molded part and alleviating anisotropy.

The arrangement direction of the fibrous fillers in the pellet can be confirmed by observing the cross-section surface of the pellet cut in the longitudinal direction with a microscope.

The second pellet is composed of a resin structure in which no fibrous fillers are contained but a second thermoplastic resin having a flow starting temperature lower than that of the first thermoplastic resin is contained.

The second pellet is obtained by, for example, pelletizing a mixture containing the second thermoplastic resin and, as needed, other components by a melt extrusion molding method or a melt compression molding method.

In the present embodiment, the second thermoplastic resin having a flow starting temperature lower than that of the first thermoplastic resin is used.

The difference in the flow starting temperature between the second thermoplastic resin and the first thermoplastic resin is preferably 5° C. or more, and more preferably 5° C. to 40° C. Alternatively, the difference in the flow starting temperature between the second thermoplastic resin and the first pellet is preferably 5° C. or more, and more preferably 5° C. to 40° C.

Selecting such a second thermoplastic resin relative to the first pellet allows the fibrous fillers to be appropriately dispersed as fiber bundles in a molded part, and the presence of the fibrous fillers as the fiber bundles during molding suppresses fiber breakage and allows long fibrous fillers to remain in the molded part, thereby making it easy to realize strength against an impact load.

The flow starting temperature of the first pellet may be measured by the same method as the above-mentioned method of measuring a flow starting temperature after the first pellet is subjected to a frost shattering.

The second thermoplastic resin preferably has a melt viscosity of 5 Pa s to 500 Pa s at a melt-kneading temperature (plasticizing part) of the pellet mixture below-mentioned (measurement conditions: the nozzle hole diameter is 0.5 mm, and the shear rate is 1000 $s^{-1}$).

Examples of the second thermoplastic resin include liquid crystal polyester resins, polypropylenes, polyamides, polyesters other than liquid crystalline polyester resins, polysulfones, polyethersulfones, polyphenylenesulfides, polyetherketones, polyetheretherketones, polycarbonates, polyphenylene ethers, and polyetherimides. Among them, liquid crystal polyester resins are preferably used.

One of the second thermoplastic resins may be used alone or at least two thereof may be used in combination.

A pellet mixture is obtained by mixing the above-mentioned first pellet and the second pellet.

The first pellet and the second pellet may be mixed at a mixing ratio (mass ratio) of the first pellet and the second pellet which preferably realizes a molded part composed of 40 parts by mass to 70 parts by mass of the thermoplastic resin and 30 parts by mass to 60 parts by mass of the fibrous fillers, when made into the molded part.

For example, the mixing ratio (mass ratio) of both is preferably 50 parts by mass to 90 parts by mass of the first pellet and 10 parts by mass to 50 parts by mass of the second pellet, more preferably 55 parts by mass to 85 parts by mass of the first pellet and 15 parts by mass to 45 parts by mass of the second pellet, and even more preferably 55 parts by mass to 80 parts by mass of the first pellet and 20 parts by mass to 45 parts by mass of the second pellet.

The first pellet and the second pellet may be, for example, separately charged into a molding machine and then mixed in the molding machine, or alternatively, may be mixed in advance to prepare a mixture. Alternatively, the first pellet and the second pellet may be used in the form of a coated product obtained by coating the surface of the first pellet with the second pellet.

When the resultant pellet mixture is used to mold the shock-absorbing member, the melt-kneading temperature (plasticizing part) of the pellet is preferably more than the flow starting temperature of the second thermoplastic resin but no more than the flow starting temperature of the first thermoplastic resin or the first pellet, for example. Specifically, the melt-kneading temperature (plasticizing part) is preferably 260° C. to 340° C. more preferably 280° C. to 320° C., and even more preferably 290° C. to 310° C. The temperature at a measuring part or a plunger part is preferably 280° C. to 400° C. more preferably 290° C. to 380° C., and even more preferably 300° C. to 370° C. The length of the fibers in a molded part tends to be increased by controlling the temperature as described above.

(Vehicle)

A vehicle according to one aspect of the present invention includes one in which the shock-absorbing member of the above-mentioned aspect of the present invention is installed in at least one selected from a front part, a rear part and a side part of the vehicle.

Examples of the vehicle include bicycles, motorcycles, four-wheeled vehicles, and trains.

For example, a structural member as shown in FIG. 1, namely, a structural member in which a shock-absorbing member 200 is installed between a front side member 400 (frame) and a bumper beam 300 is installed in a front part of a four-wheeled vehicle.

Because the shock-absorbing member of the above-mentioned embodiment is adopted in the vehicle of the present embodiment, the weight is reduced, the fuel consumption is saved, and an impact energy absorption capacity is further improved, thereby improving the collision safety.

Although the preferred embodiments according to the present invention have been described above with reference to the accompanying drawings, the present invention is not limited to such embodiments. The various shapes or combinations of each constituent members shown in the above examples are merely examples, and various modifications can be made based on design requirements or the like without departing from the gist of the present invention.

EXAMPLES

Although the present invention will be explained in further detail below with reference to examples, the present invention is not limited to these examples.

<Preparation of Resin Material>

A liquid crystal polyester resin, polypropylene, and nylon 6 were used as thermoplastic resins. In the present specification, the liquid crystal polyester resin may be abbreviated as LCP, and the polypropylene may be abbreviated as PP.

Glass fibers and carbon fibers were used as fibrous fillers. In the present specification, the glass fibers may be abbreviated as GF, and the carbon fibers may be abbreviated as CF.

Resin materials were prepared by mixing these thermoplastic resins and fibrous fillers. Specifically, a neat pellet obtained by processing a liquid crystal polyester resin, a resin pellet obtained by impregnating glass fibers with a liquid crystal polyester resin, a resin pellet obtained by impregnating glass fibers with polypropylene, and a resin pellet obtained by impregnating carbon fibers with nylon 6 were produced, respectively.

<<Production of Neat Pellet (1)>>

A neat pellet (1) (LCP 1) was produced, as follows.

p-Hydroxybenzoic acid (994.5 g, 7.2 mol), 4,4'-dihydroxybiphenyl (446.9 g, 2.4 mol), terephthalic acid (299.0 g, 1.8 mol), isophthalic acid (99.7 g, 0.6 mol), acetic anhydride (1347.6 g, 13.2 mol), and 0.9 g of 1-methylimidazole were charged into a reactor equipped with a stirrer, a torque meter, a nitrogen gas inlet tube, a thermometer and a reflux condenser, followed by sufficiently replacing the gas in the reactor with nitrogen gas. Then, the temperature therein was raised from room temperature to 150° C. over 30 minutes under a nitrogen gas stream and then maintained at 150° C. to reflux the mixture for 1 hour. Then, 1-methylimidazole (0.9 g) was added to the resultant, and the temperature thereof was raised from 150° C. to 320° C. over 2 hours 50 minutes while distilling off acetic acid produced as a by-product and unreacted acetic anhydride, and then the resultant was taken out at the end of the reaction when an increase in torque was observed, followed by cooling the resultant to room temperature. The resultant solid product was pulverized with a pulverizer to obtain a particle diameter of approximately 0.1 mm to 1 mm, followed by raising the temperature from room temperature to 250° C. over 1 hour under a nitrogen atmosphere, raising the temperature from 250° C. to 285° C. over 5 hours and then maintaining the temperature at 285° C. for 3 hours to allow solid phase polymerization to proceed. After the solid phase polymerization, the resultant was cooled to obtain a powdery liquid crystal polyester.

The thus obtained liquid crystal polyester resin had, based on the total amount of all repeating units, 60% by mol of the repeating unit (1) in which $Ar^1$ was a 1,4-phenylene group, 15% by mol of the repeating unit (2) in which $Ar^2$ was a 1,4-phenylene group, 5% by mol of the repeating unit (2) in which $Ar^2$ was a 1,3-phenylene group, and 20% by mol of the repeating unit (3) in which $Ar^3$ was a 4,4'-biphenylene group, and had a flow starting temperature of 327° C.

The resultant powdery liquid crystal polyester resin was granulated with a twin-screw extruder (manufactured by IKG Corporation under the model number of PMT 47) at a cylinder temperature of 320° C. to obtain LPC 1. The flow starting temperature of the resultant LCP 1 was 316° C.

<<Production of Neat Pellet (2)>>

A neat pellet (2) (LCP 2) was produced, as follows.

p-Hydroxybenzoic acid (994.5 g, 7.2 mol), 4,4'-dihydroxybiphenyl (446.9 g, 2.4 mol), terephthalic acid (239.2 g, 1.44 mol), isophthalic acid (159.5 g, 0.96 mol), and acetic anhydride (1347.6 g, 13.2 mol) were charged into a reactor equipped with a stirrer, a torque meter, a nitrogen gas inlet tube, a thermometer and a reflux condenser, and then 1-methylimidazole (0.9 g) was added to the mixture, followed by sufficiently replacing the gas in the reactor with nitrogen gas. Then, the temperature therein was raised from room temperature to 150° C. over 30 minutes under a nitrogen gas stream and then maintained at 150° C. to reflux the mixture for 1 hour. Then, 0.9 g of 1-methylimidazole was added to the resultant, and the temperature thereof was raised from 150° C. to 320° C. over 2 hours 50 minutes while distilling off acetic acid produced as a by-product and unreacted acetic anhydride, and then the resultant was taken out at the end of the reaction when an increase in torque was observed, followed by cooling the resultant to room temperature. The resultant solid product was pulverized with a pulverizer to obtain a particle diameter of approximately 0.1 mm to 1 mm, followed by raising the temperature from room temperature to 220° C. over 1 hour under a nitrogen atmosphere, raising the temperature from 220° C. to 240° C. over 0.5 hours and then maintaining the temperature at 240° C. for 10 hours to allow solid phase polymerization to proceed. After the solid phase polymerization, the resultant was cooled to obtain a powdery liquid crystal polyester resin.

The thus obtained liquid crystal polyester resin had, based on the total amount of all repeating units, 60% by mol of the repeating unit (1) in which $Ar^1$ was a 1,4-phenylene group, 12% by mol of the repeating unit (2) in which $Ar^2$ was a 1,4-phenylene group, 8% by mol of the repeating unit (2) in which $Ar^2$ was a 1,3-phenylene group, and 20% by mol of the repeating unit (3) in which $Ar^3$ was a 4,4'-biphenylene group, and had a flow starting temperature of 291° C.

The resultant powdery liquid crystal polyester resin was granulated with a twin-screw extruder (manufactured by IKG Corporation under the model number of PMT 47) at a cylinder temperature of 290° C. to obtain LPC 2. The flow starting temperature of the resultant LCP 2 was 284° C.

<<Production of Resin Pellet 1>>

A resin pellet 1 in which glass fibers were impregnated with a liquid crystal polyester resin was produced.

The resin pellet 1 was obtained as described below using the same manufacturing machine as shown in FIG. 5.

A GTS-40 type extruder (manufactured by PLABOR Research Laboratory of Plastics Technology Co., Ltd) was used as the extruder 120. EBD-1500A (manufactured by AIMEX CO., LTD.) was used as a belt type taking-up machine. The following glass fibers were used as fibrous fillers.

Glass fibers (GF 1): Glass fiber roving (E glass, having a number-average fiber diameter of 17 μm and a fineness of 1200 g/1000 m, and manufactured by Nippon Electric Glass Co., Ltd.).

The above-mentioned LCP 1 and LCP 2 were used as neat pellets.

The resin pellet 1 in which the amount of GF 1 was 95% by mass based on the total mass, 100 parts by mass, of LCP 1 and LCP 2 (in which the amount of LCP 1 was 85 parts by mass and that of LCP 2 was 15 parts by mass) was produced, as follows.

Step of Obtaining Resin Structure:

A glass fiber bundle 11 was heated at 150° C. to be dried in a preheating unit 121 while continuously taking up the glass fiber bundle 11 at a taking-up rate of 10 m/minute from a glass fiber roving 10 of GF 1 by operating the belt-type taking-up machine (taking-up unit 127)

Then, the LCP 1 and LCP 2 in a molten state were charged from a supply port 123*a* of an extruder 120 into a die (impregnation unit 123) connected to the front edge of the extruder 120 while supplying the dried glass fiber bundle 11 thereto. In the die (impregnation unit 123), the LCP 1 and the LCP 2 were melted at 370° C. to impregnate the glass fiber bundle 11 therewith, and the strand diameter was controlled at an outlet of the die (impregnation unit 123) with a die head having a nozzle diameter of 1.5 mm to obtain a resin structure 13 in which the amount of GF 1 was 95 parts by mass based on the total mass, 100 parts by mass, of the LCP 1 and the LCP 2 (in which the amount of the LCP 1 was 85 parts by mass and that of the LCP 2 was 15 parts by mass).

In the resultant resin structure 13, the glass fibers were arranged to be approximately parallel to the longitudinal direction of the first liquid crystal polyester resin layer.

Then, the resin structure 13 heated in the die (impregnation unit 123) was cooled to 150° C. or less in a cooling unit 125.

Step of Obtaining Pellet:

Then, the cooled resin structure 13 was taken up in a strand shape by the belt-type taking-up machine (taking-up unit 127) to feed to a pelletizer (cutting unit 129) and cut to a predetermined length (12 mm) in the longitudinal direction thereof, thereby obtaining a resin pellet 1 (pellet 15) having a cylindrical shape.

<<Production of Resin Pellet 2>>

A resin pellet 2 in which the amount of GF 1 was 216 parts by mass based on the total mass, 100 parts by mass, of the LCP 1 and the LCP 2 (in which the amount of the LCP 1 was 85 parts by mass and the amount of the LCP 2 was 15 parts by mass) was obtained by the same method as that of the resin pellet 1 except that a die head having a nozzle diameter of 1.1 mm was used.

<<Production of Resin Pellet 3>>

Glass fibers (GF 2): a glass fiber roving (E glass having a number-average fiber diameter of 10 μm and a fineness of 1400 g/1000 m, and manufactured by Nippon Electric Glass Co., Ltd.) were used as fibrous fillers.

A resin pellet 3 in which the amount of GF 2 was 60 parts by mass based on the total mass, 100 parts by mass, of the LCP 1 and the LCP 2 (in which the amount of the LCP 1 was 85 parts by mass and the amount of the LCP 2 was 15 parts by mass) was obtained by the same method as that of the resin pellet 1 except that GF 2 was used instead of GF 1 and a die head having a nozzle diameter of 1.8 mm was used.

<<Production of Resin Pellet 4>>

A resin pellet 4 in which the amount of GF 2 was 102 parts by mass based on the total mass, 100 parts by mass, of the LCP 1 and the LCP 2 (in which the amount of the LCP 1 was 85 parts by mass and the amount of the LCP 2 was 15 parts by mass) was obtained by the same method as that of the resin pellet 1 except that GF 2 was used instead of GF 1 and a die head having a nozzle diameter of 1.5 mm was used.

<<Production of Resin Pellet 5>>

A resin pellet 5 in which the amount of GF 2 was 169 parts by mass based on the total mass, 100 parts by mass, of the LCP 1 and the LCP 2 (in which the amount of the LCP 1 was 85 parts by mass and the amount of the LCP 2 was 15 parts by mass) was obtained by the same method as that of the resin pellet 1 except that GF 2 was used instead of GF 1 and a die head having a nozzle diameter of 1.3 mm was used.

<<Production of Resin Pellet 6>>

A resin pellet 6 in which the amount of GF 2 was 60 parts by mass based on the total mass, 100 parts by mass, of the LCP 1 and the LCP 2 (in which the amount of the LCP 1 was 75 parts by mass and the amount of the LCP 2 was 25 parts by mass) was obtained by the same method as that of the resin pellet 1 except that GF 2 was used instead of GF 1 and a die head having a nozzle diameter of 1.8 mm was used.

<<Pellet of 35% by Mass of Short GF Impregnated with LCP>>

A product under a trade name of SUMIKASUPER E6007LHF Z (manufacture by SUMITOMO CHEMICAL COMPANY, LIMITED) was used as a resin pellet in which glass fibers were impregnated with a liquid crystal polyester resin.

<<Pellet of 40% by Mass of Long GF Impregnated with PP>>

A product under the trade name of SUMISTRAN PG4003-3 (manufacture by SUMITOMO CHEMICAL COMPANY, LIMITED) was used as a resin pellet in which glass fibers were impregnated with polypropylene (PP).

<<Pellet of 30% by Mass of Long CF Impregnated with PA 6>>

A resin pellet in which carbon fibers were impregnated with nylon 6 (PA 6).

PA 6 (UBE nylon 1013B, manufactured by UBE Corporation) was used as a neat pellet. Carbon fibers (CF 1): carbon fiber roving (under the trade name of "TR50S15L", having a number-average fiber diameter of 7 μm and a fineness of 1000 g/1000 m, and manufactured by Mitsubishi Chemical Corporation) was used as fibrous fillers.

A pellet of 30% by mass of long CF impregnated with PA 6 in which the amount of CF 1 was 43 parts by mass based on 100 parts by mass of PA 6 was obtained by the same method as that of the resin pellet 1 except that CF 1 was used instead of GF 1, PA 6 was melted at 280° C. in the die (impregnation unit 123) to impregnate a carbon fiber bundle 11 therewith, and a die head nozzle having a nozzle diameter of 2.0 mm was used at an outlet of the die (impregnation unit 123).

<Production of Shock-Absorbing Member>

Example 1 and Comparative Example 1

Step of Obtaining Pellet Mixture:

A resin composition (1) composed of a pellet mixture was obtained by mixing the LCP 2 which was a neat pellet prepared above and the resin pellet 1 at a ratio described in Table 1.

Step of Subjecting Resin Composition to an Injection-Molding:

The resin composition (1) was charged into a hopper of an injection molding machine TR450EH3 (manufactured by Sodick Co., Ltd.).

The resin composition (1) was melt-kneaded under the molding temperature conditions in which the temperature of a plasticizing part was 300° C. and the temperature of a plunger part was 360° C., and then injected into a mold having a honeycomb structure under other molding conditions described below to mold an injection molded part provided with a main part having a honeycomb structure in the same form as shown in FIG. 2, thereby obtaining a shock-absorbing member.

Other molding conditions: The back pressure was 1 MPa, the injection speed was 200 mm/s, the mold temperature was 80° C., the holding pressure was 70 MPa, and the holding pressure time was 5 seconds.

The honeycomb structure of the main part was composed of 32 pieces of tubular cells each having a height of 80 mm, an aperture plane which has a substantially regular hexagonal shape, and vertices each having a curvature radius of 2 mm, when viewed from the topside thereof, and the thickness of a flange member in the tubular cell was 3 mm, the cell inner diameter at an end face in the flange member side was 12.0 mm, the cell inner diameter at an end face (aperture plane) in the side opposite to the flange member was 13.0 mm in Example 1, and the cell inner diameter at an end face (aperture plane) in the side opposite to the flange member was 12.5 mm in Comparative Example 1. The thickness of the cell wall at an end face of the tubular cell in the flange member side was 2.0 mm, the thickness of the cell wall at an end face (aperture plane) in the side opposite to the flange member was 1.0 mm (the average thickness of the cell wall from an end face in the flange member side to an end face (aperture plane) in the side opposite to the flange member was 1.5 mm) in Example 1, and the thickness of the cell wall at an end face (aperture plane) in the side opposite to the flange member was 1.5 mm (the average thickness of the cell wall from an end face in the flange member side to an end face (aperture plane) in the side opposite to the flange member was 1.75 mm) in Comparative Example 1.

Example 2 and Comparative Example 2

Step of Obtaining Pellet Mixture:

A resin composition (3) composed of a pellet mixture was obtained by mixing the LCP 2 which was a neat pellet prepared above and the resin pellet 3 at a ratio described in Table 1.

Step of Subjecting Resin Composition to an Injection-Molding:

Except that the resin composition (3) was used instead of the resin composition (1), each shock-absorbing member was produced by molding an injection molded part in a similar manner to Example 1 in Example 2 or in a similar manner to Comparative Example 1 in Comparative Example 2.

Example 3 and Comparative Example 3

Step of Obtaining Pellet Mixture:

A resin composition (4) composed of a pellet mixture was obtained by mixing the LCP 2 which was a neat pellet prepared above and the resin pellet 4 at a ratio described in Table 1.

Step of Subjecting Resin Composition to an Injection-Molding:

Except that the resin composition (4) was used instead of the resin composition (1), each shock-absorbing member was produced by molding an injection molded part in a similar manner to Example 1 in Example 3 or in a similar manner to Comparative Example 1 in Comparative Example 3.

Example 4

A shock-absorbing member was produced by molding an injection molded part in a similar manner to Example 1.

Example 5

A shock-absorbing member was produced by molding an injection molded part in a similar manner to Example 1 except that a resin composition (2) composed of a pellet mixture obtained by mixing the LCP 2 which was a neat pellet and the resin pellet 2 at a ratio described in Table 1 was used.

Example 6

A shock-absorbing member was produced by molding an injection molded part in a similar manner to Example 3.

Example 7

A shock-absorbing member was produced by molding an injection molded part in a similar manner to Example 1 except that a resin composition (5) composed of a pellet mixture obtained by mixing the LCP 1 which was a neat pellet and the resin pellet 5 at a ratio described in Table 1 was used, along with which the temperature of the plasticizing part was changed to 330° C. and the temperature of the plunger part was changed to 340° C.

Example 8

A shock-absorbing member was produced by molding an injection molded part in a similar manner to Example 1 except that the pellet containing 35% by mass of short GF impregnated with LCP was used, along with which the temperature of the plasticizing part was changed to 350° C.

Example 9

A shock-absorbing member was produced by molding an injection molded part in a similar manner to Example 1 except that the pellet containing 40% by mass of long GF impregnated with PP was used, along with which the temperature of the plasticizing part was changed to 250° C., the temperature of the plunger part was changed to 250° C., and the temperature of a mold was changed to 50° C.

Example 10

A shock-absorbing member was produced by molding an injection molded part in a similar manner to Example 1 except that the pellet containing 30% by mass of long CF impregnated with PA 6 was used, along with which the temperature of the plasticizing part was changed to 270° C., the temperature of the plunger part was changed to 270° C., and the temperature of a mold was changed to 70° C.

Example 11

A shock-absorbing member was produced by molding an injection molded part in a similar manner to Example 7.

Example 12

A shock-absorbing member was produced by molding an injection molded part in a similar manner to Example 9.

Example 13

A shock-absorbing member was produced by molding an injection molded part in a similar manner to Example 10.

Example 14

Step of Obtaining Pellet Mixture:

A resin composition (6) composed of a pellet mixture was obtained by mixing the LCP 2 which was a neat pellet prepared above and the resin pellet 6 at a ratio described in Table 1.

Step of subjecting resin composition to an injection-molding:

A shock-absorbing member was produced by molding an injection molded part in a similar manner to Example 1, except that the resin composition (6) was used instead of the resin composition (1), along with which the temperature of the plunger part was changed to 350° C.

Example 15

A shock-absorbing member was produced by molding an injection molded part in a similar manner to Example 14, except that a mold having the following shape (honeycomb structure) was used.

The honeycomb structure of the main part was composed of 32 pieces of tubular cells each having a height of 80 mm, an aperture plane which has a substantially regular hexagonal shape, and vertices each having a curvature radius of 2 mm, when viewed from the topside thereof, and the thickness of a flange member in the tubular cell was 3 mm, the cell inner diameter at an end face in the flange member side was 12.3 mm, the cell inner diameter at an end face (aperture plane) in the side opposite to the flange member was 13.3 mm. The thickness of the cell wall at an end face of the tubular cell in the flange member side was 1.7 mm, and the thickness of the cell wall at an end face (aperture plane) in the side opposite to the flange member was 0.7 mm (the average thickness of the cell wall from an end face in the flange member side to an end face (aperture plane) in the side opposite to the flange member was 1.2 mm).

Example 16

A shock-absorbing member was produced by molding an injection molded part in a similar manner to Example 14, except that a mold having a honeycomb structure having the following shape was used.

The honeycomb structure of the main part was composed of 56 pieces of tubular cells each having a height of 80 mm, an aperture plane which has a substantially regular hexagonal shape, and vertices each having a curvature radius of 2 mm, when viewed from the topside thereof, and the thickness of a flange member in the tubular cell was 3 mm, the cell inner diameter at an end face in the flange member side was 7.6 mm, and the cell inner diameter at an end face (aperture plane) in the side opposite to the flange member was 8.6 mm. The thickness of the cell wall at an end face of the tubular cell in the flange member side was 1.7 mm, and the thickness of the cell wall at an end face (aperture plane) in the side opposite to the flange member was 0.7 mm (the average thickness of the cell wall from an end face in the flange member side to an end face (aperture plane) in the side opposite to the flange member was 1.2 mm).

[Method of Calculating Cell Wall Thickness Gradient]

The cell wall thickness gradient between tubular cells in an injection molded part of a shock-absorbing member in each example was determined by the following procedures. The resultant values are shown in Tables 2 to 5.

Procedure 1): A central axis a which passed through a center of gravity at one end face of the first tubular cell having a height of 80 mm and a center of gravity at the other end face thereof was determined.

Procedure 2): Arbitrary two faces b and c perpendicular to the central axis a were set at each portion where the height at the first tubular cell from a flange member was 5 mm or 75 mm and the distance between the two faces b and c was 70 mm.

Procedure 3): t1 (unit mm) was determined as a thickness of the cell wall at a position where the cell wall between the first tubular cell and the second tubular cell adjacent to the first tubular cell crossed the face b (on the aperture plane side).

Procedure 4): t2 mm was determined as a thickness of the cell wall at a position where the cell wall between the first tubular cell and the second tubular cell adjacent to the first tubular cell crossed the face c (on the flange member side).

Procedure 5): The cell wall thickness gradient was calculated by ($|t2-t1|/h$) in which h was 70.

[Measurement of Length-Weighted Average Fiber Length of Fibrous Fillers Contained in Injection Molded Part]

Each length-weighted average fiber length of glass fibers or carbon fibers contained in an injection molded part was determined by the following procedures.

Procedure (1): A test piece having a maximum length (length at the longest portion in the projection plane of the test piece) of 20 mm or more, a maximum perpendicular length (length at the longest portion in a direction of 90° against the maximum length) of 20 mm or more, and a test piece-projected area of 200 $mm^2$ or more was cut from an outermost wall of the main part.

Procedure (2): The test piece was heated in a muffle furnace at 600° C. for 4 hours in the case of the glass fibers or at 500° C. for 3 hours in the case of the carbon fibers.

li: Fiber length of fibrous fillers ni: Number of fibrous fillers, the fiber length of which was li.

Resin materials and molding conditions used to produce each shock-absorbing member are shown in Table 1.

TABLE 1

| | | | | Resin composition (1) | Resin composition (2) | Resin composition (3) | Resin composition (4) | Resin composition (5) | Resin composition (6) | Pellet containing 35% by mass of short GF impregnated with LCP | Pellet containing 40% by mass of long GF impregnated with PP | Pellet containing 30% by mass of long CF impregnated with PA6 |
|---|---|---|---|---|---|---|---|---|---|---|---|---|
| Resin material | Resin pellet | LCP1 | parts by mass | 85 | 85 | 85 | 85 | 85 | 75 | | | |
| | | LCP2 | parts by mass | 15 | 15 | 15 | 15 | 15 | 25 | | | |
| | | PA6 | parts by mass | | | | | | | | | 100 |
| | | GF1 | parts by mass | 95 | 216 | | | | | | | |
| | | GF2 | parts by mass | | | 60 | 102 | 169 | 60 | | | |
| | | CF1 | parts by mass | | | | | | | | | 43 |
| | Neat pellet | LCP1 | parts by mass | | | | | 154 | | | | |
| | | LCP2 | parts by mass | 76 | 116 | 40 | 53 | | 40 | | | |
| Molding conditions | Molding temperature | Plasticizing part | ° C. | 300 | 300 | 300 | 300 | 330 | 350 | 350 | 250 | 270 |
| | | Plunger part | ° C. | 360 | 360 | 360 | 360 | 340 | 360 | 360 | 250 | 270 |
| | Back pressure | | MPa | 1 | 1 | 1 | 1 | 1 | 1 | 1 | 1 | 1 |
| | Injection speed | | mm/s | 200 | 200 | 200 | 200 | 200 | 200 | 200 | 200 | 200 |
| | Mold temperature | | ° C. | 80 | 80 | 80 | 80 | 80 | 80 | 80 | 50 | 70 |
| | Holding pressure | | MPa | 70 | 70 | 70 | 70 | 70 | 70 | 70 | 70 | 70 |
| | Holding pressure time | | s | 5 | 5 | 5 | 5 | 5 | 5 | 5 | 5 | 5 |

Procedure (3): The resultant (only fibers) obtained by removing the resin component from the cut test piece in the procedure (2) was dispersed in 1000 mL of an aqueous solution containing 0.05% by volume of a surfactant (Micro 90 manufactured by INTERNATIONAL PRODUCTS CORPORATION) to obtain a dispersion liquid.

Procedure (4): One hundred milliliters of the dispersion liquid was taken out, and diluted 10 times with pure water. 50 mL of the diluted dispersion liquid was taken out and dispersed in a petri dish, and then fibers dispersed in the petri dish were observed with a microscope (VH-ZST (manufactured by KEYENCE CORPORATION) at a magnification of 20 times). Ten images were taken for each sample so that the taken areas did not overlap.

Procedure (5): The lengths of all fibers present in one taken image were measured with a measurement tool of the microscope. The length of a bent fiber was measured by a multi-point measurement. The same operation was sequentially conducted on 10 taken images to measure the length of the fibers until the total measured number of fibers exceeded 500.

Procedure (6): The length-weighted average fiber length (lm) of the fibrous filler contained in an injection molded part was obtained from the fiber length of the fibers measured in the procedure (5) ($\Sigma ni>500$).

$$Lm = (\Sigma li^2 \times ni)/(\Sigma li \times ni)$$

<Evaluation (1)>

The shock-absorbing member of each example was subjected to a falling weight impact test described below to determine the maximum load, the average load, the impact energy absorption amount, the impact energy absorption amount per unit weight, and the impact energy absorption efficiency. These results are shown in Tables 2 and 3.

In addition, the amount of fibers contained in the injection molded part; the cell wall thicknesses t1 (in the aperture plane side) and t2 (in the flange member side), and the cell wall thickness gradient $|t2-t1|/h$ in the honeycomb structure; and the length-weighted average fiber length of fibers contained in the injection molded part are shown in Tables 2 and 3.

In addition, the total volume, the total weight, and the useful volume of the injection molded part are shown in Tables 2 and 3. The useful volume of the injection molded part indicates the volume of the injection molded part present in an effective displacement region of a conic solid at the falling weight impact test (the distance from the initial position of the conic solid (the upper surface of the test sample 990 placed on a test stand 910) to a conic solid stopper).

<<Falling Weight Impact Test>>

Figure 6:
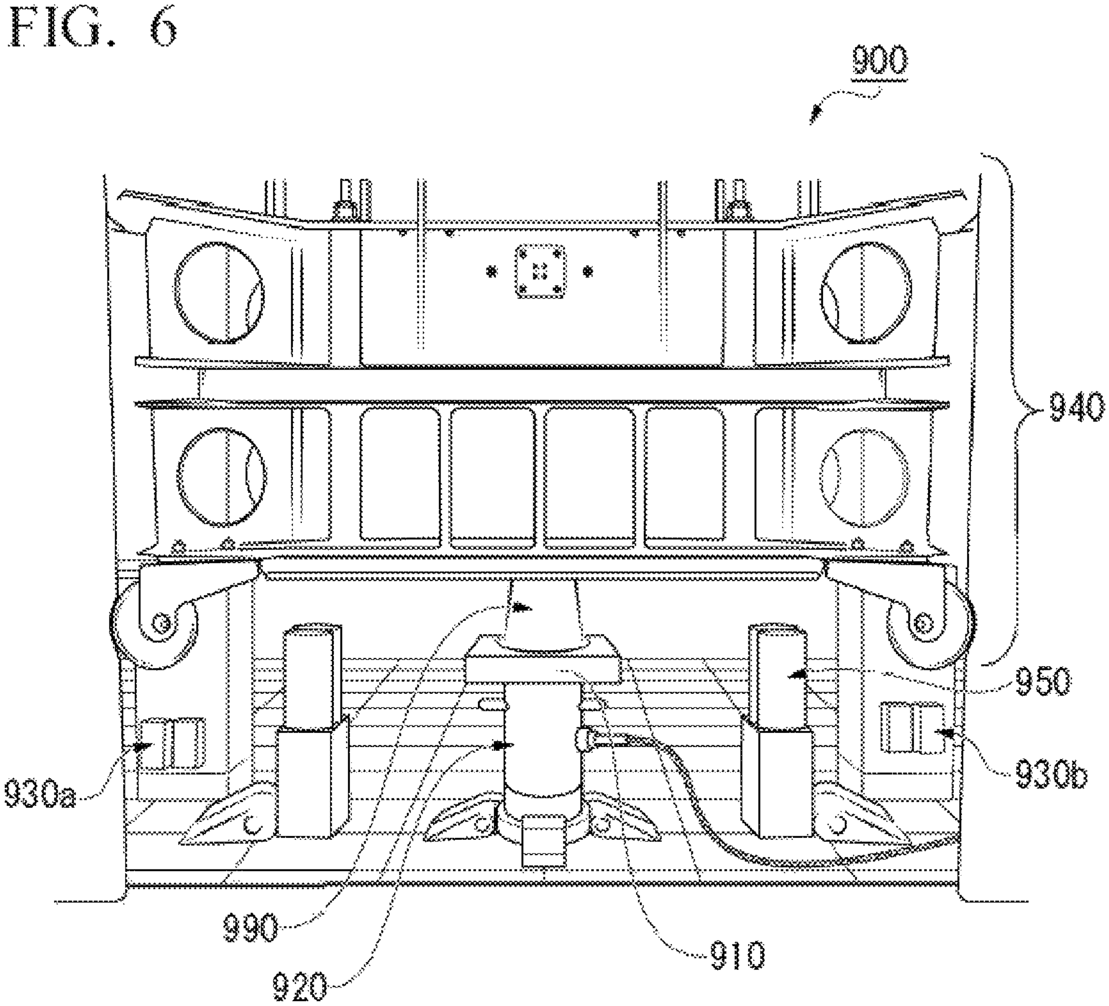
FIG. 6 is a drawing showing a falling weight impact tester.

FIG. 6 is a drawing showing a falling weight impact tester.

As shown in FIG. 6, a device 900 includes: a test stand 910; a load meter 920 which supports the test stand 910 in the lower side; displacement gauges 930*a* and 930*b* placed apart on both left and right sides of the load meter 920; a conic solid 940 configured to fall from the upside of the test stand 910; and a conic solid stopper 950 configured to stop the conic solid 940 when fallen.

In FIG. 6, a test sample 990*a* is placed on the test stand 910. The fallen conic solid 940 contacted with the upper surface of the test sample 990.

Method of Falling Weight Impact Test:

The shock-absorbing member of each examples was used as a test sample 990.

An impact was applied to the test sample 990 placed on a load meter 920 using a device 900 shown in FIG. 6 by allowing a conic solid 940 to fall freely. At that time, a load [kN] applied to the test sample 990 and the displacement [mm] of the upper surface of the test sample 990 were measured.

Conditions of Falling Weight Impact Test:

Set collision rate: 30 km/h

Weight of conic solid: 300 kg

Falling height: 3.54 m

Effective displacement (distance from the initial position of the conic solid (the upper surface of the test sample 990 placed on a test stand 910) to a conic solid stopper): 55 mm when the inclination angle of the test stand 910 was 0°, and 30 mm when the inclination angle of the test stand 910 was 15°.

Used Device:

A product under the model name of "CLP-30BS" manufactured by TOKYO SOKKI KENKYUJO CO., LTD., was used as the load meter 920.

Products under the model name of "LK-G505 (north side: No. 1271178, and south side: No. 1261015)" manufactured by KEYENCE CORPORATION were used as the displacement gauges 930*a* and 930*b*.

A product under the model name of "DIS-5200A" manufactured by KYOWA ELECTRONIC INSTRUMENTS CO., LTD., was used as a recording device.

A product under the model name of "MEMRECAM GX-1" manufactured by nac Image Technology Inc., was used as a high-speed camera.

The analog filters of the load meter 920 and the displacement gauges 930*a* and 930*b* were set to 10 kHz. The sampling frequency of the recording device was set to 50 kHz, and the analog filter thereof was set to 10 kHz.

In order to confirm the behavior of the test sample, the photographing was performed at 5000 fps using the high-speed camera.

[Measurement of Impact Energy Absorption Amount]

Figure 7:
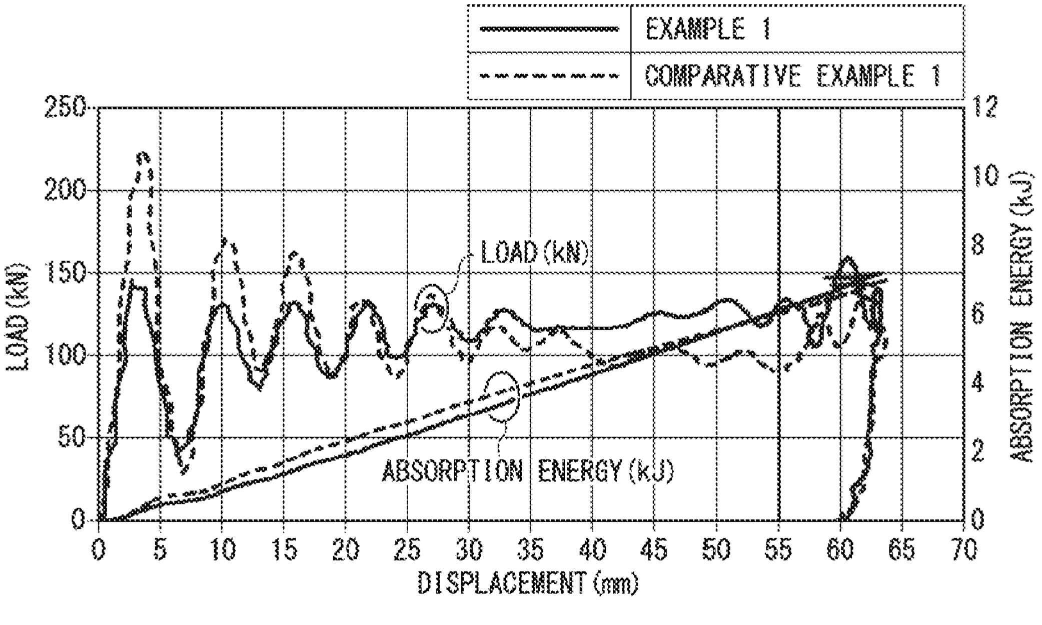
FIG. 7 is a graph showing results of a falling weight impact test on each shock-absorbing member of Example 1 and Comparative Example 1.

FIG. 7 is a graph showing results of a falling weight impact test (in which the inclination angle of the test stand 910 was 0°, and the effective displacement was 55 mm) of each shock-absorbing member in Example 1 and Comparative Example 1.

The vertical axis on the left side indicates the load (kN) applied to the test sample 990, and the vertical axis on the right side indicates the absorption energy (kJ).

The horizontal axis indicates the displacement [mm] of the upper surface of the test sample 990 (the lower surface of the conic solid 940 in contact with the upper surface of the test sample 990). The initial position of the upper surface of the test sample 990 was determined to be 0 mm.

The impact energy absorption amount of the shock-absorbing member of each example at the displacement of 0 mm to 55 mm was measured based on the results of the graph shown in FIG. 7.

In addition, the maximum load, the average load, the impact energy absorption amount per unit weight, and the impact energy absorption efficiency were measured from the results of the graph.

Each shock-absorbing member of Examples 2 to 3, Comparative Examples 2 to 3 and Examples 14 to 16 was also measured in a similar manner.

The impact energy absorption amount per unit weight was calculated as follows. It is meant that the larger this value, the higher the impact energy absorption capacity.

Impact energy absorption amount per unit weight (J/g) =Impact energy absorption amount up to effective displacement/Mass of forming material destroyed up to effective displacement The impact energy absorption efficiency was calculated as follows. It is meant that the larger this value, the less likely an excessive maximum load is generated when an impact energy is absorbed.

Impact energy absorption efficiency=Actual impact energy absorption amount (kJ)/(Maximum load (kN)×Effective displacement (m))

TABLE 2

| | | | | Ex. 1 | C. Ex. 1 | Ex. 2 | C. Ex. 2 | Ex. 3 | C. Ex. 3 |
|---|---|---|---|---|---|---|---|---|---|
| Injection molded part | Resin material | | | Resin composition (1) | | Resin composition (3) | | Resin composition (4) | |
| | Amount of fillers | | % by mass | 35 | | 30 | | 40 | |
| | Honeycomb structure | Number of tubular cells | cells | 32 | 32 | 32 | 32 | 32 | 32 |
| | | Cell inner diameter (in aperture plane side) | mm | 13.0 | 12.5 | 13.0 | 12.5 | 13.0 | 12.5 |
| | | Cell inner diameter (in flange member side) | mm | 12.0 | 12.0 | 12.0 | 12.0 | 12.0 | 12.0 |
| | | Thickness of cell wall (in aperture plane side) | mm | 1.0 | 1.5 | 1.0 | 1.5 | 1.0 | 1.5 |
| | | Thickness of cell wall (in flange member side) | mm | 2.0 | 2.0 | 2.0 | 2.0 | 2.0 | 2.0 |
| | | Average thickness of cell wall | mm | 1.5 | 1.75 | 1.5 | 1.75 | 1.5 | 1.75 |
| | | Thickness t1 of cell wall (in aperture plane side) | mm | 1.06250 | 1.53125 | 1.06250 | 1.53125 | 1.06250 | 1.53125 |
| | | Thickness t2 of cell wall (in flange member side) | mm | 1.93750 | 1.96875 | 1.93750 | 1.96875 | 1.93750 | 1.96875 |
| | | Cell wall thickness gradient $\|t2 - t1\|/h$ | — | $125 \times 10^{-4}$ | $62.5 \times 10^{-4}$ | $125 \times 10^{-4}$ | $62.5 \times 10^{-4}$ | $125 \times 10^{-4}$ | $62.5 \times 10^{-4}$ |
| | Length-weighted average fiber length | | mm | 6.4 | 6.7 | 4.6 | 4.9 | 4.9 | 6.0 |
| | Total volume | | $cm^3$ | 151.7 | 168.5 | 151.7 | 168.5 | 151.7 | 168.5 |

TABLE 2-continued

| | | | Ex. 1 | C. Ex. 1 | Ex. 2 | C. Ex. 2 | Ex. 3 | C. Ex. 3 |
|---|---|---|---|---|---|---|---|---|
| | Total weight | g | 241.3 | 270.7 | 232.4 | 262.9 | 250.8 | 279.2 |
| | Useful volume | $cm^3$ | 70.3 | 85.5 | 70.3 | 85.5 | 70.3 | 85.5 |
| Evaluation | Maximum load | kN | 145 | 208 | 143 | 212 | 147 | 225 |
| | Average load | kN | 113 | 114 | 108 | 99 | 113 | 109 |
| | Impact energy absorption amount | kJ | 6.2 | 6.2 | 5.9 | 5.5 | 6.2 | 6.0 |
| | Impact energy absorption amount per unit weight | J/g | 55.4 | 45.1 | 54.8 | 41.2 | 53.3 | 42.4 |
| | Impact energy absorption efficiency | — | 0.78 | 0.54 | 0.75 | 0.47 | 0.77 | 0.48 |

(Ex.: Example, C. Ex.: Comparative Example)

It was confirmed from the results shown in Table 2 by the comparison of Example 1 with Comparative Example 1, the comparison of Example 2 with Comparative Example 2, and the comparison of Example 3 and Comparative Example 3 that the impact energy absorption capacity of the shock-absorbing members of the examples, in which the tubular cells were arrayed via cell walls of which the thickness gradient (|t2−t1|/h) satisfies the relationship of expression (G), was further improved in comparison with that of the shock-absorbing members of the comparative examples.

TABLE 3

| | | | | Example 14 | Example 15 | Example 16 |
|---|---|---|---|---|---|---|
| Injection molded part | Resin material | | | Resin composition (6) | Resin composition (6) | Resin composition (6) |
| | Amount of fillers | | % by mass | 30 | 30 | 30 |
| | Honeycomb structure | Number of tubular cells | cells | 32 | 32 | 56 |
| | | Cell inner diameter (in aperture plane side) | mm | 13.0 | 13.3 | 8.6 |
| | | Cell inner diameter (in flange member side) | mm | 12.0 | 12.3 | 7.6 |
| | | Thickness of cell wall (in aperture plane side) | mm | 1.0 | 0.7 | 0.7 |
| | | Thickness of cell wall (in flange member side) | mm | 2.0 | 1.7 | 1.7 |
| | | Average thickness of cell wall | mm | 1.5 | 1.2 | 1.2 |
| | | Thickness t1 of cell wall (in aperture plane side) | mm | 1.06250 | 0.76250 | 0.76250 |
| | | Thickness t2 of cell wall (in flange member side) | mm | 1.93750 | 1.63750 | 1.63750 |
| | | Cell wall thickness gradient $\|t2 - t1\|/h$ | — | $125 \times 10^{-4}$ | $125 \times 10^{-4}$ | $125 \times 10^{-4}$ |
| | Length-weighted average fiber length | | mm | 3.5 | 2.6 | 2.6 |
| | Total volume | | $cm^3$ | 151.7 | 146.9 | 157.3 |
| | Total weight | | g | 232.4 | 219.6 | 234.4 |
| | Useful volume | | $cm^3$ | 70.3 | 55.8 | 62.7 |
| Evaluation | Maximum load | | kN | 181 | 166 | 200 |
| | Average load | | kN | 139 | 114 | 142 |
| | Impact energy absorption amount | | kJ | 7.4 | 6.2 | 7.6 |
| | Impact energy absorption amount per unit weight | | J/g | 69.0 | 73.9 | 80.9 |
| | Impact energy absorption efficiency | | — | 0.74 | 0.68 | 0.69 |

It was confirmed from the results shown in Table 3 that the impact energy absorption capacity of all of the shock-absorbing members of Example 14 to 16, in which the tubular cells were arrayed via cell walls of which the thickness gradient (|t2−t1|/h) satisfies the relationship of expression (G), was high.

It was particularly confirmed that the impact energy absorption amount per unit weight of the shock-absorbing members of Example 14 to 16 was large.

In addition, it was confirmed that the impact energy absorption amount per unit weight was increased in a sequential order of Example 14, Example 15, and Example 16. It was assumed from the comparison of Example 14 with Example 15 that this phenomenon was caused by effects of thinning cell walls. Furthermore, it was assumed from the comparison of Example 15 with Example 16 that this phenomenon was caused by effects of decreasing the cell inner diameter.

<Evaluation (2)>

The falling weight impact test was conducted in a similar manner to that described in the <Evaluation (1)>, except that each shock-absorbing member of Examples 4 to 10 was used as a test sample 990 to be placed on a test stand 910 at an inclination angle of 15°. The effective displacement was defined as 30 mm.

Figure 8:
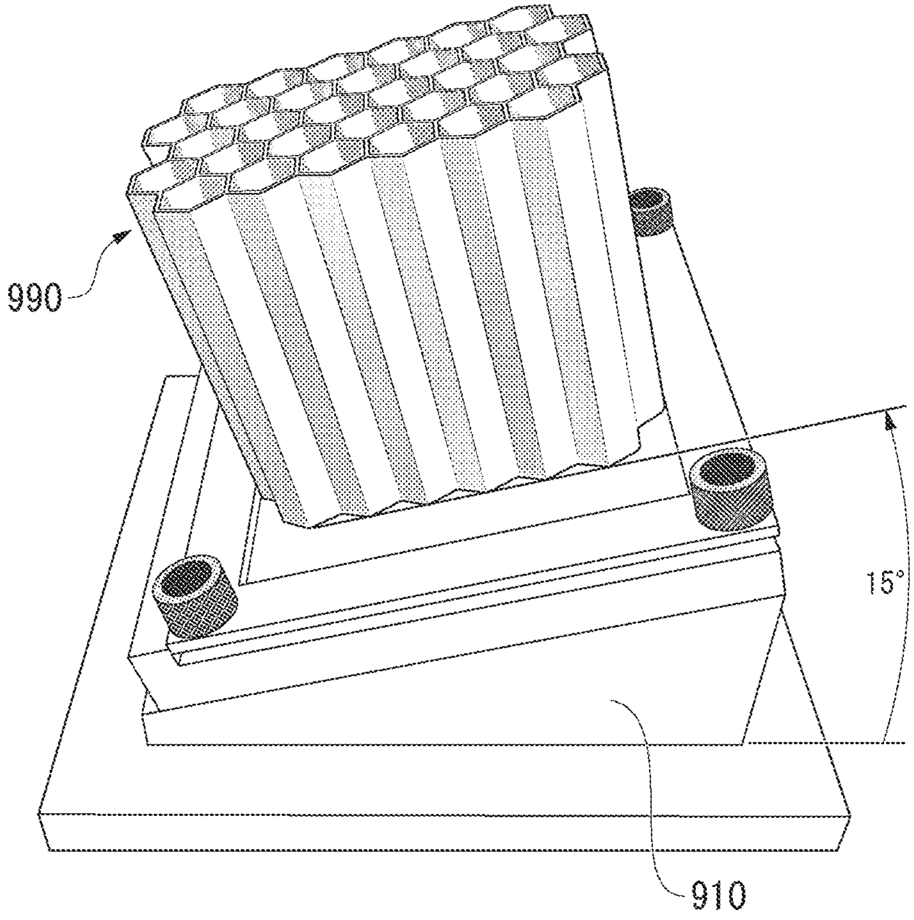
FIG. 8 is a drawing illustrating a state of a test sample 990 placed on a test stand 910 to conduct a falling weight impact test in evaluation (2).

FIG. 8 is a drawing showing the state of the test sample 990 placed on the test stand 910 when the falling weight impact test was conducted on the evaluation (2). In FIG. 8, the test sample 990 was placed at an inclination angle of 15° relative to the test stand 910.

The impact energy absorption amount of each shock-absorbing member was measured at the displacement of 0 mm to 30 mm. Furthermore, the impact energy absorption amount per unit weight was determined from the results.

Furthermore, the dependency on angle was evaluated in accordance with the following equation. These results are shown in Table 4.

Dependency on angle=Impact energy absorption amount per unit weight at an inclination angle of 15°/Impact energy absorption amount per unit weight at an inclination angle of 0°

It is meant that the larger this value, the lower the dependency on angle against an impact, and the lower effects of a collision angle on the impact energy absorption capacity.

The impact energy absorption amount per unit weight at an inclination angle of 0° was determined by conducting a falling weight impact test (in which the inclination angle of the test stand 910 was 0°, and the effective displacement was 55 mm) in a similar manner to that described in the <evaluation (1)>, except that each shock-absorbing member of Examples 4 to 10 was used as a test sample 990.

In addition, the amount of fibers contained in an injection molded part; the cell wall thicknesses t1 (in the aperture plane side) and t2 (in the flange member side), and the cell wall thickness gradient |t2−t1|/h in a honeycomb structure; and the length-weighted average fiber length of fibers contained in the injection molded part are shown in Table 4.

In addition, the total volume, the total weight, and the useful volume of the injection molded part are shown in Table 4. The useful volume of the injection molded part indicates the volume of the injection molded part present in an effective displacement region of a conic solid at the falling weight impact test (the distance from the initial position of the conic solid (the upper surface of the test sample 990 placed on a test stand 910) to a conic solid stopper).

TABLE 4

| | | | | Ex. 4 | Ex. 5 | Ex. 6 | Ex. 7 | Ex. 8 | Ex. 9 | Ex. 10 |
|---|---|---|---|---|---|---|---|---|---|---|
| Injection molded part | Resin material | | | Resin composition (1) | Resin composition (2) | Resin composition (4) | Resin composition (5) | Pellet containing 35% by mass of short GF impregnated with LCP | Pellet containing 40% by mass of long GF impregnated with PP | Pellet containing 30% by mass of long CF impregnated with PA6 |
| | Amount of fillers | | % by mass | 35 | 50 | 40 | 40 | 35 | 40 | 30 |
| | Honeycomb structure | Number of tubular cells | cells | 32 | 32 | 32 | 32 | 32 | 32 | 32 |
| | | Cell inner diameter (in aperture plane side) | mm | 13.0 | 13.0 | 13.0 | 13.0 | 13.0 | 13.0 | 13.0 |
| | | Cell inner diameter (in flange member side) | mm | 12.0 | 12.0 | 12.0 | 12.0 | 12.0 | 12.0 | 12.0 |
| | | Thickness of cell wall (in aperture plane side) | mm | 1.0 | 1.0 | 1.0 | 1.0 | 1.0 | 1.0 | 1.0 |
| | | Thickness of cell wall (in flange member side) | mm | 2.0 | 2.0 | 2.0 | 2.0 | 2.0 | 2.0 | 2.0 |
| | | Average thickness of cell wall | mm | 1.5 | 1.5 | 1.5 | 1.5 | 1.5 | 1.5 | 1.5 |
| | | Thickness t1 of cell wall (in aperture plane side) | mm | 1.06250 | 1.06250 | 1.06250 | 1.06250 | 1.06250 | 1.06250 | 1.06250 |
| | | Thickness t2 of cell wall (in flange member side) | mm | 1.93750 | 1.93750 | 1.93750 | 1.93750 | 1.93750 | 1.93750 | 1.93750 |
| | | Cell wall thickness gradient \|t2 − t1\|/h | — | $125 \times 10^{-4}$ | $125 \times 10^{-4}$ | $125 \times 10^{-4}$ | $125 \times 10^{-4}$ | $125 \times 10^{-4}$ | $125 \times 10^{-4}$ | $125 \times 10^{-4}$ |
| | Length-weighted average fiber length | | mm | 6.4 | 4.7 | 4.9 | 1.8 | 0.4 | 2.2 | 2.0 |
| | Total volume | | $cm^3$ | 151.7 | 151.7 | 151.7 | 151.7 | 151.7 | 151.7 | 151.7 |
| | Total weight | | g | 241.3 | 266.0 | 250.8 | 249.7 | 239.1 | 170.6 | 183.8 |
| | Useful volume | | $cm^3$ | 21.8 | 21.8 | 21.8 | 21.8 | 21.8 | 21.8 | 21.8 |
| Evaluation | Impact energy absorption amount | | kJ | 1.6 | 1.7 | 1.7 | 1.8 | 1.0 | 1.5 | 2.0 |
| | Impact energy absorption amount per unit weight | | J/g | 46.1 | 44.5 | 47.2 | 50.2 | 29.1 | 61.2 | 75.7 |
| | Dependency on angle at inclination angle of 15° | | — | 0.83 | 0.78 | 0.88 | 0.74 | 0.49 | 0.74 | 0.72 |

(Ex.: Example)

It was confirmed from the results shown in Table 4 that the shock-absorbing members of Examples 4 to 7, 9 and 10 exhibited lower dependency on angle against an impact and even higher impact energy absorption capacity than those of the shock-absorbing members of Example 8.

It is assumed that the length-weighted average fiber length of fibrous fillers in the molded part mainly contributed in this result.

<Evaluation (3)>

The shock-absorbing members of Examples 11 to 13 were stored still for 7 days in a constant temperature and humidity chamber at a temperature of 45° C. and a relative humidity of 98% RH. The water absorption rate of the shock-absorbing member after storage was measured under the following measurement conditions. The results are shown in Table 5.

Water Absorption Rate Measurement Conditions

Device: Constant temperature and humidity chamber FH06C (manufactured by ETAC Engineering Co., Ltd.)

Water absorption conditions: 45° C.×98% RH×168 hours

Measurement of weight of molded article in an absolute dry state: The molded article immediately after molding is allowed to be cooled in an aluminum pack, and accurately weighed to 0.001 g using a precision balance.

Measurement of weight of molded article after water absorption: The molded article after water absorption was taken out from the constant temperature and humidity chamber, and accurately weighed to 0.001 g using a precision balance.

A falling weight impact test (in which the inclination angle of a test stand 910 was 0°, and the effective displacement was 55 mm) was conducted in a similar manner to that described in the <evaluation (1)>, except that each shock-absorbing member of Example 11 to 13 before and after the storage was used as a test sample 990 to be placed on the test table 910.

The impact energy absorption amount of the shock-absorbing member of each example was measured at the displacement of 0 mm to 55 mm. In addition, the impact energy absorption amount per unit weight was determined from the results. Furthermore, the dependency on water absorption was evaluated in accordance with the following equation. These results are shown in Table 5.

Dependency on water absorption=Impact energy absorption amount per unit weight after water absorption/Impact energy absorption amount per unit weight before water absorption It is meant that the larger this value, the lower the dependency on water absorption, and the smaller effects of water absorption on the impact energy absorption capacity.

In addition, the amount of fibers contained in an injection molded part; the cell wall thicknesses t1 (in the aperture plane side) and t2 (in the flange member side), and the cell wall thickness gradient |t2−t1|/h in a honeycomb structure; the length-weighted average fiber length of fibers contained in the injection molded part are shown in Table 5.

In addition, the total volume, the total weight before water absorption, and the useful volume of the injection molded part are shown in Table 5. The useful volume of the injection molded part indicates the volume of the injection molded part present in an effective displacement region of a conic solid at the falling weight impact test (the distance from the initial position of the conic solid (the upper surface of the test sample 990 placed on a test stand 910) to a conic solid stopper).

TABLE 5

| | | | | Example 11 | Example 12 | Example 13 |
|---|---|---|---|---|---|---|
| Injection molded part | Resin material | | | Resin composition (5) | Pellet containing 40% by mass of long GF impregnated with PP | Pellet containing 30% by mass of long CF impregnated with PA6 |
| | Amount of fillers | | % by mass | 40 | 40 | 30 |
| | Honeycomb structure | Number of tubular cells | cells | 32 | 32 | 32 |
| | | Cell inner diameter (in aperture plane side) | mm | 13.0 | 13.0 | 13.0 |
| | | Cell inner diameter (in flange member side) | mm | 12.0 | 12.0 | 12.0 |
| | | Thickness of cell wall (in aperture plane side) | mm | 1.0 | 1.0 | 1.0 |
| | | Thickness of cell wall (in flange member side) | mm | 2.0 | 2.0 | 2.0 |
| | | Average thickness of cell wall | mm | 1.5 | 1.5 | 1.5 |
| | | Thickness t1 of cell wall (in aperture plane side) | mm | 1.06250 | 1.06250 | 1.06250 |
| | | Thickness t2 of cell wall (in flange member side) | mm | 1.93750 | 1.93750 | 1.93750 |
| | | Cell wall thickness gradient \|t2 − t1\|/h | | $125 \times 10^{-4}$ | $125 \times 10^{-4}$ | $125 \times 10^{-4}$ |
| | Length-weighted average fiber length | | mm | 1.8 | 2.2 | 2.0 |

| | | State of molded part | | | | | |
|---|---|---|---|---|---|---|---|
| | | Before water absorption | After water absorption | Before water absorption | After water absorption | Before water absorption | After water absorption |
| Water absorption rate | % by mass | — | 0.004 | — | 0.10 | — | 3.82 |
| Total volume | $cm^3$ | 151.7 | 151.7 | 151.7 | 151.7 | 151.7 | 151.7 |

TABLE 5-continued

| | | | Example 11 | | Example 12 | | Example 13 | |
|---|---|---|---|---|---|---|---|---|
| Evaluation | Total weight before water absorption | g | 249.7 | — | 170.6 | — | 183.8 | — |
| | Useful volume | $cm^3$ | 70.3 | 70.3 | 70.3 | 70.3 | 70.3 | 70.3 |
| | Impact energy absorption amount | kJ | 7.9 | 7.9 | 6.5 | 4.8 | 9.0 | 8.0 |
| | Impact energy absorption amount per unit weight | J/g | 68.3 | 68.3 | 82.2 | 61.2 | 105.6 | 90.4 |
| | Dependency on water absorption | — | 1.00 | | 0.75 | | 0.86 | |

It was confirmed from the results shown in Table 5 that the impact energy absorption amount per unit weight of the shock-absorbing member of Example 11 did not change between before and after water absorption, and the dependency on water absorption was low.

It was assumed that this result was caused by using a liquid crystal polyester resin as a thermoplastic resin.

EXPLANATION OF REFERENCE NUMERALS

100: manufacturing machine. 101 to 109: transfer roll, 120: extruder, 121: preheating unit, 123: impregnation unit, 125: cooling unit, 127: taking-up unit, 129: cutting unit, 200: shock-absorbing member, 300: bumper beam, 400: front side member, 500: shock-absorbing member, 510: main part, 512: tubular cell, 514: cell wall, 520: flange member, 530: injection molded part, 900: device, 910: test stand, 920: load meter, 930*a*: displacement gauge, 930*b*: displacement gauge, 940: conic solid, 950: conic solid stopper, 990: test sample

The invention claimed is:

1. A shock-absorbing member comprising a molded part comprising a thermoplastic resin, wherein the molded part comprises a main part having a honeycomb structure filled with plural tubular cells, part or all of the tubular cells constituting the honeycomb structure are arrayed via cell walls of which a thickness gradient (|t2−t1|/h) defined as follows satisfies a relationship as shown below:

$$62.5\times10^{-4} < \frac{|t2-t1|}{h} < 250\times10^{-4}$$

wherein h is a distance between a face b and a face c perpendicular to a central axis a, the central axis a passing through a center of gravity at one end face of a first tubular cell and a center of gravity at the other end face of the first tubular cell, the first tubular cell having a height H with a unit of mm, the face b and the face c being located within a range of the height H of the first tubular cell satisfying 0<h<H, and the distance h having a unit of mm, t1 is a thickness of a cell wall at a position where the cell wall between the first tubular cell and a second tubular cell adjacent to the first tubular cell crosses the face b, t1 having a unit of mm, t2 is a thickness of a cell wall at a position where the cell wall between the first tubular cell and the second tubular cell adjacent to the first tubular cell crosses the face c, t2 having a unit of mm.

2. The shock-absorbing member according to claim 1, wherein the molded part is an injection molded part.

3. The shock-absorbing member according to claim 1, wherein the molded part further comprises a fibrous filler.

4. The shock-absorbing member according to claim 3, wherein a length-weighted average fiber length of the fibrous filler in the molded part is 0.5 mm or more.

5. The shock-absorbing member according to claim 1, wherein the thermoplastic resin is a liquid crystal polyester resin.

6. A vehicle comprising a shock-absorbing member of claim 1, the shock-absorbing member being installed in at least one selected from a front part, a rear part and a side part of the vehicle.

* * * * *